(12) United States Patent
Abeshouse et al.

(10) Patent No.: US 8,660,937 B1
(45) Date of Patent: *Feb. 25, 2014

(54) METHOD, APPARATUS AND SYSTEM FOR ADVANCING A BIDDER TO A SELECTED RANK

(71) Applicant: Ariba, Inc., Sunnyvale, CA (US)

(72) Inventors: Daniel Abeshouse, Edgewood, PA (US); Scott W. Atkinson, Pittsburgh, PA (US); David J. Becker, Sewickley, PA (US); Sheila C. Halter, Pittsburgh, PA (US); Kimberly A. Harrigal, Pittsburgh, PA (US); Vincent F. Rago, Pittsburgh, PA (US); William D. Rupp, Pittsburgh, PA (US); David M. Scoular, Pittsburgh, PA (US); Robert G. Stevens, Pittsburgh, PA (US); Douglas R. Wagner, Bethel Park, PA (US); Robert B. Lang, Jr., Glenshaw, PA (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,468

(22) Filed: Dec. 21, 2012

Related U.S. Application Data

(60) Continuation of application No. 12/966,941, filed on Dec. 13, 2010, now Pat. No. 8,364,577, which is a continuation of application No. 09/967,656, filed on Sep. 28, 2001, now Pat. No. 7,870,054, which is a division of application No. 09/710,097, filed on Nov. 10, 2000.

(51) Int. Cl.
*G06Q 30/00* (2012.01)
(52) U.S. Cl.
USPC .................................. 705/37; 705/38; 705/80
(58) Field of Classification Search
USPC ................................................ 705/37, 38, 80
See application file for complete search history.

(56) References Cited

U.S. PATENT DOCUMENTS 6,243,691 B1 *  6/2001  Fisher et al. ..................... 705/37
8,364,577 B2 *  1/2013  Abeshouse et al. ............. 705/37

* cited by examiner

*Primary Examiner* — Nga B. Nguyen
(74) *Attorney, Agent, or Firm* — Van Pelt, Yi & James LLP

(57) ABSTRACT

Techniques for determining a suggested bid value that surpasses a selected bid are disclosed. A user selectable facility is provided. In response to receiving a selection event associated with the user selectable facility: (1) the value of the selected bid, which is other than the first ranked bid value, is established; (2) the suggested bid value is calculated by applying a predetermined minimum differential value to the selected bid value; and (3) the suggested bid value is conveyed to a user.

16 Claims, 17 Drawing Sheets

SYSTEM FLOW

| | COORDINATOR | BUYER | SUPPLIER |
|---|---|---|---|
| INITIAL CONTACT 102 | CONTACT BUYER | PROVIDE DATA | |
| RFQ 104 | COLLECT & ADMINISTER RFQ DATA | PROVIDE RFQ DATA | |
| | PUBLISH & ADMINISTER RFQ | | ACCESS RFQ |
| | MANAGE RFQ RESPONSE | | RESPOND TO RFQ |
| AUCTION ADMINISTRATION 106 | | REQUEST AUCTION | |
| | COORDINATE & ADMINISTER AUCTION SETUP | | |
| | ASSIST & ADMINISTER USER AUCTION PREP | | PREPARE FOR AUCTION |
| CONDUCT AUCTION 108 | ASSIST & ADMINISTER AUCTION | OBSERVE | BID |
| ADMINISTER AUCTION RESULTS 110 | ANALYZE & ADMINISTER CBE RESULTS | VIEW AUCTION RESULTS | VIEW AUCTION RESULTS |
| CONTRACT ADMINISTRATION 112 | | SETTLEMENT | SETTLEMENT |

CBE 053 - TEST 35 MO-LI SG
FILE VIEW PREFERENCES WINDOWS HELP

CURRENT TIME: 09:53:05 AM EST

CBE 053: TEST 35 MO-LI SG
SPONSOR: FREEMARKETS, INC.          VIEW CURRENCY: USD
STATUS: OPEN                        LOTS: 3
MARKET SAVINGS: -55.44%

AVAILABLE LOTS

| NUM | NAME       | CLOSE TIME | STATUS       |
|-----|------------|------------|--------------|
| 01  | LOT 1 PARTS | 9:41:00 AM | CLOSED       |
| 02  | LOT 2 PARTS | 9:50:00 AM | CLOSED       |
| 03  | LOT 3 PARTS | 9:55:00 AM | OVERTIME (2) |

LOT 03: LOT 3 PARTS
MARKET LEADER: B & D MACHINE
MARKET vs RESERVE: -132,000.00 (-52.80%)          TIME REMAINING: 00:01:55
MARKET vs HISTORIC: -182,000.00 (-60.67%)         STATUS: OVERTIME (2)
                                                  TOTAL BIDS: 35

| | HISTORIC | RESERVE | MKT LEAD | MKT vs HIST | CURRENCY |
|---|---|---|---|---|---|
|   | 4,000,000.00 | 4,500,000.00 | 1,594,880.53 | -50.13% | USD |
|   | 1,200,000.00 | 910,000.00 | 738,000.00 | -462,000.00 | USD |
| * | 300,000.00 | 250,000.00 | 118,000.00 | -182,000.00 | USD |
| TOTALS: | 5,500,000.00 | 5,660,000.00 | 2,450,880.53 | -55.44% | |

BID HISTORY: LOT 03 - LOT 3 PARTS

| BIDDER | BID TIME | EXT BID | BID vs HIST | BID vs RESV |
|---|---|---|---|---|
| B & A ENTERPRISES INC. - OPTION A | 10/31/00 9:49:00 AM EST | 150,000.00 | -150,000.00 | -100,000.00 |
| B & D MACHINE - OPTION A | 10/31/00 9:49:10 AM EST | 149,000.00 | -151,000.00 | -101,000.00 |
| B & B SCREW MACHINE SPECIALISTS, LTD. - OPTION B | 10/31/00 9:49:26 AM EST | 147,000.00 | -153,000.00 | -103,000.00 |
| B & F MACHINE COMPANY - OPTION B | 10/31/00 9:49:23 AM EST | 144,000.00 | -156,000.00 | -106,000.00 |
| B & A ENTERPRISES INC. - OPTION A | 10/31/00 9:49:31 AM EST | 143,000.00 | -157,000.00 | -107,000.00 |
| B & B SCREW MACHINE SPECIALISTS, LTD. - OPTION B | 10/31/00 9:49:34 AM EST | 142,000.00 | -158,000.00 | -108,000.00 |
| B & B SCREW MACHINE SPECIALISTS, LTD. - OPTION A | 10/31/00 9:51:44 AM EST | 142,000.00 | -158,000.00 | -108,000.00 |
| B & F MACHINE COMPANY - OPTION B | 10/31/00 9:49:42 AM EST | 141,500.00 | -158,500.00 | -108,500.00 |
| B & G MFG. CO. - OPTION B | 10/31/00 9:49:38 AM EST | 140,000.00 | -160,000.00 | -110,000.00 |
| B & D MACHINE - OPTION A | 10/31/00 9:49:54 AM EST | 136,500.00 | -163,500.00 | -113,500.00 |
| B & F MACHINE COMPANY - OPTION A | 10/31/00 9:50:00 AM EST | 135,500.00 | -164,500.00 | -114,500.00 |
| B & D MACHINE - OPTION A | 10/31/00 9:50:07 AM EST | 134,500.00 | -165,500.00 | -115,500.00 |
| B & D MACHINE - OPTION A | 10/31/00 9:51:16 AM EST | 133,500.00 | -166,500.00 | -116,500.00 |
| B & B SCREW MACHINE SPECIALISTS, LTD. - OPTION A | 10/31/00 9:52:28 AM EST | 132,500.00 | -167,500.00 | -117,500.00 |
| B & B SCREW MACHINE SPECIALISTS, LTD. - OPTION B | 10/31/00 9:52:34 AM EST | 131,500.00 | -168,500.00 | -118,500.00 |
| B & F MACHINE COMPANY - OPTION A | 10/31/00 9:52:50 AM EST | 119,000.00 | -181,000.00 | -131,000.00 |
| B & D MACHINE - OPTION A | 10/31/00 9:53:05 AM EST | 118,000.00 | -182,000.00 | -132,000.00 |

LOCK

RIGHT CLICK FOR DETAILED BIDDING INFORMATION

CBE 053 - TEST 35 MO-LI SG

FILE  VIEW  PREFERENCES  WINDOWS  HELP

CURRENT TIME: 09:53:07 AM EST

SUBMIT BID IN LOT 03: LOT 3 PARTS

MY BID: 300,000.00

[TAKE MARKET]  [SUBMIT BID]
[RELOAD LAST BID]

BID vs MARKET: 182,000.00
BID CHANGE:

AVAILABLE OFFERINGS: OPTION A

AVAILABLE LOTS

| NUM | NAME | CLOSE TIME | STATUS | BEST OFFERING |
|---|---|---|---|---|
| 01 | LOT 1 PARTS | 9:41:00 AM | CLOSED | |
| 02 | LOT 2 PARTS | 9:50:00 AM | CLOSED | |
| 03 | LOT 3 PARTS | 9:55:00 AM | OVERTIME | * OPTION A |
| | TOTALS: | | | |

CBE 053: TEST 35 MO-LI SG
SPONSOR: FREEMARKETS, INC.
BID CURRENCY: USD          LOTS: 3          STATUS: OPEN

LOT 03: LOT 3 PARTS
MY RANK: 6
TOTAL BIDS: 35

TIME REMAINING: 00:01:53
STATUS: OVERTIME

| | MY BEST BID | MKT LEAD | MY vs MKT | RESERVE |
|---|---|---|---|---|
| | 1,603,989.97 | 1,594,880.53 | 0.57% | 4,500,000.00 |
| | 797,000.00 | 738,000.00 | 59,000.00 | 910,000.00 |
| | 300,000.00 | 118,000.00 | 182,000.00 | 250,000.00 |
| | | | | 910,000.00 |

BID HISTORY: LOT 03 - LOT 3 PARTS

| BIDDER | EXT BID | BID TIME |
|---|---|---|
| BIDDER 5 | 150,000.00 | 10/31/00 9:49:00 AM EST |
| BIDDER 2 | 149,000.00 | 10/31/00 9:49:10 AM EST |
| BIDDER 4 | 147,000.00 | 10/31/00 9:49:26 AM EST |
| BIDDER 3 | 144,000.00 | 10/31/00 9:49:23 AM EST |
| BIDDER 5 | 143,000.00 | 10/31/00 9:49:31 AM EST |
| BIDDER 4 | 142,000.00 | 10/31/00 9:49:34 AM EST |
| BIDDER 4 | 141,500.00 | 10/31/00 9:49:44 AM EST |
| BIDDER 7 | 140,000.00 | 10/31/00 9:49:42 AM EST |
| BIDDER 3 | 136,500.00 | 10/31/00 9:49:38 AM EST |
| BIDDER 3 | 135,500.00 | 10/31/00 9:49:54 AM EST |
| BIDDER 2 | 134,500.00 | 10/31/00 9:50:00 AM EST |
| BIDDER 3 | 133,500.00 | 10/31/00 9:50:07 AM EST |
| BIDDER 2 | 132,500.00 | 10/31/00 9:51:16 AM EST |
| BIDDER 4 | 131,500.00 | 10/31/00 9:52:28 AM EST |
| BIDDER 3 | 119,000.00 | 10/31/00 9:52:34 AM EST |
| BIDDER 2 | 118,000.00 | 10/31/00 9:53:05 AM EST |

CBE 418 - TEST 36 INDEX SG NH
FILE VIEW PREFERENCES WINDOWS HELP

CURRENT TIME: 10:19:32 AM EST

CBE 418: TEST 36 INDEX SG NH
SPONSOR: FREEMARKETS, INC.
STATUS: OPEN          VIEW CURRENCY: PCT
MARKET SAVINGS: -102.50%          LOTS: 3

AVAILABLE LOTS

| NUM | NAME | CLOSE TIME | STATUS |
|---|---|---|---|
| 01 | INTER-REGIONAL TRANSPORTATION | 10:25:00 AM | OPEN |
| 02 | INTRA-REGIONAL TRANSPORTATION | 10:32:00 AM | OPEN |
| 03 | INTRA-STATE TRANSPORTATION | 10:39:00 AM | OPEN |

LOT 01: INTER-REGIONAL TRANSPORTATION
MARKET LEADER: B & D MACHINE
MARKET vs RESERVE: -11.300 (-102.73%)
MARKET vs HISTORIC: -12.300 (-102.50%)

TIME REMAINING: 00:05:28
STATUS: OPEN
TOTAL BIDS: 14

| HISTORIC | RESERVE | MKT LEAD | MKT vs HIST | CURRENCY |
|---|---|---|---|---|
| 12.000 | 11.000 | -0.300 | | PCT |
| -8.000 | -10.000 | | -12.300 | PCT |
| | 0.010 | | | PCT |

BID HISTORY: LOT 01 - INTER-REGIONAL TRANSPORTATION

| BIDDER | BID TIME | EXT BID | BID vs HIST | BID vs RESV |
|---|---|---|---|---|
| B & B SCREW MACHINE SPECIALSTS, LTD. | 10/31/00 10:16:51 AM EST | 10.000 | -2.000 | -1.000 |
| B & F MACHINE COMPANY | 10/31/00 10:16:03 AM EST | 9.750 | -2.250 | -1.250 |
| B & F MACHINE COMPANY | 10/31/00 10:16:39 AM EST | 9.500 | -2.500 | -1.500 |
| B & F MACHINE COMPANY | 10/31/00 10:16:43 AM EST | 9.250 | -2.750 | -1.750 |
| B & B SCREW MACHINE SPECIALSTS, LTD. | 10/31/00 10:17:54 AM EST | 9.200 | -2.800 | -1.800 |
| B & A ENTERPRISES INC | 10/31/00 10:18:12 AM EST | 9.000 | -3.000 | -2.000 |
| B & D MACHINE | 10/31/00 10:16:46 AM EST | 5.000 | -7.000 | -6.000 |
| B & D MACHINE | 10/31/00 10:17:05 AM EST | 4.800 | -7.200 | -6.200 |
| B & F MACHINE COMPANY | 10/31/00 10:18:02 AM EST | 4.750 | -7.250 | -6.250 |
| B & D MACHINE | 10/31/00 10:17:10 AM EST | 4.600 | -7.400 | -6.400 |
| B & G MFG. CO. | 10/31/00 10:16:15 AM EST | 0.000 | -12.000 | -11.000 |
| B & G MFG. CO. | 10/31/00 10:17:14 AM EST | -0.100 | -12.100 | -11.100 |
| B & G MFG. CO. | 10/31/00 10:17:52 AM EST | -0.200 | -12.200 | -11.200 |
| B & D MACHINE | 10/31/00 10:18:41 AM EST | -0.300 | -12.300 | -11.300 |

LOCK

RIGHT CLICK FOR DETAILED BIDDING INFORMATION

CBE 418 - TEST 36 INDEX SG NH
FILE VIEW PREFERENCES WINDOWS HELP

CURRENT TIME: 10:19:25 AM EST

SUBMIT BID IN LOT 01: INTER-REGIONAL TRANSPORTATION
MY BID: 10.000

TAKE NEXT — BID NOT SUBMITTED
RELOAD LAST BID — SUBMIT BID
BID vs NEXT:
BID CHANGE: 0.000

CBE 418: TEST 36 INDEX SG NH
SPONSOR: FREEMARKETS, INC.      LOTS: 3      STATUS: OPEN
BID CURRENCY: PCT

LOT 01: INTER-REGIONAL TRANSPORTATION
MY RANK:                                     TIME REMAINING: 00:05:35
                                             STATUS: OPEN

| MY BID | NEXT PLACE BID | MY vs NEXT | RESERVE |
|--------|----------------|------------|---------|
| ★ 10.000 |              |            | 11.000  |
| -5.000 |                |            | -10.000 |
| 5.000  |                |            | 0.010   |

AVAILABLE LOTS

| NUM | NAME | CLOSE TIME | STATUS |
|-----|------|------------|--------|
| 01 | INTER-REGIONAL TRANSPORTATION | 10:25:00 AM | OPEN |
| 02 | INTRA-REGIONAL TRANSPORTATION | 10:32:00 AM | OPEN |
| 03 | INTRA-STATE TRANSPORTATION | 10:39:00 AM | OPEN |

BID HISTORY: LOT 01 - INTER-REGIONAL TRANSPORTATION

BID HISTORY IS NOT AVAILABLE UNTIL YOU SUBMIT A VALID BID IN THIS LOT.

FIG. 13

CBE 418 - TEST 36 INDEX SG NH
FILE VIEW PREFERENCES WINDOWS HELP
CURRENT TIME: 10:19:42 AM EST

SUBMIT BID IN LOT 01: INTER-REGIONAL TRANSPORTATION
MY BID: 9.000
TAKE NEXT
RELOAD LAST BID    SUBMIT BID
BID vs NEXT: 4.250
BID CHANGE:

CBE 418: TEST 36 INDEX SG NH
SPONSOR: FREEMARKETS, INC.
BID CURRENCY: PCT    LOTS: 3    STATUS: OPEN

LOT 01: INTER-REGIONAL TRANSPORTATION
MY RANK: 4    TIME REMAINING: 00:05:18    STATUS: OPEN

| MY BID | NEXT PLACE BID | MY vs NEXT | RESERVE |
|---|---|---|---|
| 9.000 | 4.750 | 4.250 | 11.000 |
|  |  |  | -10.000 |
|  |  |  | 0.010 |

AVAILABLE LOTS

| NUM | NAME | CLOSE TIME | STATUS |
|---|---|---|---|
| 01 | INTER-REGIONAL TRANSPORTATION | 10:25:00 AM | OPEN ★ |
| 02 | INTRA-REGIONAL TRANSPORTATION | 10:32:00 AM | OPEN |
| 03 | INTRA-STATE TRANSPORTATION | 10:39:00 AM | OPEN |

BID HISTORY: LOT 01 - INTER-REGIONAL TRANSPORTATION

| BIDDER | EXT BID | BID TIME |
|---|---|---|
| BIDDER | 10.000 | 10/31/00 10:16:51 AM EST |
| BIDDER | 9.750 | 10/31/00 10:16:03 AM EST |
| BIDDER | 9.500 | 10/31/00 10:16:39 AM EST |
| BIDDER | 9.250 | 10/31/00 10:16:43 AM EST |
| BIDDER | 9.200 | 10/31/00 10:17:54 AM EST |
| B & A ENTERPRISES INC | 9.000 | 10/31/00 10:18:12 AM EST |

FIG. 15

CBE 418 - TEST 36 INDEX SG NH

FILE  VIEW  PREFERENCES  WINDOWS  HELP

CURRENT TIME: 10:19:24 AM EST

SUBMIT BID IN LOT 01: INTER-REGIONAL TRANSPORTATION

MY BID: -0.200

[ TAKE NEXT ]
[ RELOAD LAST BID ]  [ SUBMIT BID ]

BID vs NEXT: -0.100
BID CHANGE:

CBE 418: TEST 36 INDEX SG NH
SPONSOR: FREEMARKETS, INC.
BID CURRENCY: PCT     LOTS: 3     STATUS: OPEN

LOT 01: INTER-REGIONAL TRANSPORTATION
MY RANK: 2     TIME REMAINING: 00:05:36     STATUS: OPEN

AVAILABLE LOTS

| NUM | NAME | CLOSE TIME | STATUS | MY BID | NEXT PLACE BID | MY vs NEXT | RESERVE |
|---|---|---|---|---|---|---|---|
| 01 | INTER-REGIONAL TRANSPORTATION | 10:25:00 AM | OPEN ★ | -0.200 | -0.300 | -0.100 | 11.000 |
| 02 | INTRA-REGIONAL TRANSPORTATION | 10:32:00 AM | OPEN | -5.000 | | | -10.000 |
| 03 | INTRA-STATE TRANSPORTATION | 10:39:00 AM | OPEN | 5.000 | | | 0.010 |

BID HISTORY: LOT 01 - INTER-REGIONAL TRANSPORTATION

| BIDDER | EXT BID | BID TIME |
|---|---|---|
| BIDDER | 10.000 | 10/31/00 10:16:51 AM EST |
| BIDDER | 9.750 | 10/31/00 10:16:03 AM EST |
| BIDDER | 9.500 | 10/31/00 10:16:39 AM EST |
| BIDDER | 9.250 | 10/31/00 10:16:43 AM EST |
| BIDDER | 9.200 | 10/31/00 10:17:54 AM EST |
| BIDDER | 9.000 | 10/31/00 10:18:12 AM EST |
| BIDDER | 5.000 | 10/31/00 10:16:46 AM EST |
| BIDDER | 4.800 | 10/31/00 10:17:05 AM EST |
| BIDDER | 4.750 | 10/31/00 10:18:02 AM EST |
| BIDDER | 4.600 | 10/31/00 10:17:10 AM EST |
| B & G MFG. CO. | 0.000 | 10/31/00 10:16:15 AM EST |
| B & G MFG. CO. | -0.100 | 10/31/00 10:17:14 AM EST |
| B & G MFG. CO. | -0.200 | 10/31/00 10:17:52 AM EST |

FIG. 16

METHOD, APPARATUS AND SYSTEM FOR ADVANCING A BIDDER TO A SELECTED RANK

CROSS REFERENCE TO OTHER APPLICATIONS

This application is a continuation of co-pending U.S. patent application Ser. No. 12/966,941, entitled METHOD, APPARATUS AND SYSTEM FOR ADVANCING A BIDDER TO A SELECTED RANK filed Dec. 13, 2010 which is incorporated herein by reference for all purposes, which is a continuation of U.S. patent application Ser. No. 09/967,656, now U.S. Pat. No. 7,870,054, entitled METHOD, APPARATUS AND SYSTEM FOR ADVANCING A BIDDER TO A SELECTED RANK filed Sep. 28, 2001 which is incorporated herein by reference for all purposes, which is a divisional of co-pending U.S. patent application Ser. No. 09/710,097, entitled METHOD, APPARATUS AND SYSTEM FOR PROVIDING VARIABLE MARKET INFORMATION DISCLOSURE IN AN AUCTION filed Nov. 10, 2000 which is incorporated herein by reference for all purposes.

STATEMENT REGARDING FEDERALLY SPONSORED RESEARCH

Not Applicable.

BACKGROUND OF THE INVENTION

1. Field of the Invention

The disclosed invention relates generally to conducting auctions, and in particular to restricting access to market information in online electronic auctions.

2. Description of the Background

Procurement and selling of supplies has traditionally involved high transaction costs. Particularly, the cost of information searching regarding suppliers and sellers and their goods and services has often been prohibitively high. The introduction of electronic commerce has introduced new methods of procurement and selling that lower some of the transaction costs associated with procurement. Online procurement, or business-to-business electronic commerce, matches purchasers and suppliers so that transactions can take place electronically. The terms "purchaser" and "buyer" are used interchangeably herein to describe the party that desires to purchase goods or services in an auction. The terms "supplier" and "bidder" are used interchangeably herein to describe the party that desires to sell goods or services in the auction. Three models for online procurement are catalog, buyer-bidding auction, and supplier-bidding auction.

The "catalog" model of online procurement allows customers to obtain information regarding products and services from a single supplier, i.e., single-source catalogs. Early electronic catalogs were developed by individual suppliers to help customers obtain information about products provided by the developing supplier and order those products electronically. Customers, however, were often not satisfied with such single-source catalogs but rather preferred to compare a number of competing products to facilitate a comparison of features and pricing. Thus, certain suppliers began to include competitors' products on their systems. By offering competing products in one catalog, those suppliers created "electronic markets."

The electronic markets created by suppliers, however, could be biased toward the supplier offering the electronic market. Thus, unbiased electronic markets that promote competition were developed to further lower purchase prices.

For standard products and services, third party market makers compiled databases of related products and services from various suppliers to provide a single market from which similar products and services may be compared and through which those goods and services may be purchased. Purchasers may, thus, access the database of such a third party market, view information and pricing information related to each desired product or service, and order the desired products and services in a single visit to the third party database.

When many purchasers compete for the right to buy from one supplier, a buyer-bidding auction model is created. In a certain buyer-bidding auction, potential purchasers compete for a product or service by submitting one or more bids to a website operated by the buyer-bidding auction coordinator. After the bids have been received, the supplier may choose to accept the highest bid, thereby binding the high bidder to a contract for the sale of the product or service.

The catalog and buyer-bidding auction types of electronic markets, however, do not work well in some situations. For example, if the required product is custom made for the purchaser, it is difficult for suppliers to publish a set price in advance for a catalog market. Likewise, it is difficult for purchasers to specify all of the details of the product they want to purchase in a buyer-bidding auction.

Traditionally, when a company required a custom industrial product, procurement was made by a purchaser for the company who searched for potential suppliers and acquired custom price quotes from those suppliers for the needed custom product. The search process tended to be slow because suppliers had to be sought out and then negotiations had to take place. The search process also tended to be somewhat random because it often relied heavily on personal relationships between purchasers and suppliers. There were also significant costs associated with locating vendors, comparing products, negotiating, and paperwork preparation in a purchase decision. The cost of switching suppliers may also be prohibitive because of the cost of searching for other qualified suppliers. Thus, purchasers disadvantageously received price quotes from is existing suppliers that were not the lowest price that could have been obtained by a more thorough supplier search. New suppliers were also placed at a disadvantage due to the difficulty and cost of marketing to purchasers who have existing suppliers.

As an alternative, purchasers may use on-line auctions having prequalified bidders to save money. The assignee of the present application developed a system, wherein suppliers downwardly bid against one another to achieve the lowest market price in a supplier-bidding, auction.

In a supplier-bidding auction, bid prices typically start high and move downward in a reverse-auction format as suppliers interact to establish a low price at the close of the auction. The auction marketplace is typically one-sided, i.e., one purchaser and many potential suppliers. Either goods or services may be purchased in an auction, and the goods may be of any type including, for example, office products, finished products, other products, parts, components, or materials. "Components" typically are fabricated tangible pieces or parts that are assembled into durable products. Example components include gears, bearings, appliance shelves, and door handles. "Materials" are often raw materials that may be purchased in bulk and that are further transformed into product. Example materials include corn syrup and sheet steel.

Furthermore, industrial purchasers often desire to purchase more than one component at a time. They may purchase whole families of similar components or groups of components that are related to one another by, for example, the final product into which they are incorporated. As an example, a purchaser might purchase a given plastic knob in two different colors, or might purchase a nameplate in four different languages. Those parts may be so similar that it is only practical to purchase the parts from the same supplier because, for example, all of the knobs can be made using the same mold. Those items are therefore grouped into a single lot. Suppliers in industrial auctions may, therefore, be required to provide unit price quotes for all line items in a lot.

The process for a supplier-bidding auction is described below with reference to FIGS. 1 and 2. FIG. 1 illustrates the functional elements and entities in a supplier-bidding auction 56, while FIG. 2 is a diagram that identifies the tasks performed by each of the involved entities.

The supplier-bidding auction model typically requires that the bidding product or service be defined by the purchaser 10. An auction coordinator 20 may work with the purchaser 10 to prepare for and conduct an auction 56 and to define potential new supply relationships resulting from the auction 56.

In the example illustrated in FIG. 2, the purchaser 10 provides data to the coordinator 20 in the Initial Contact phase 102 of the auction 56. The coordinator 20 then prepares a specification 50 for each desired product 52. Once the product 52 is defined, potential suppliers 30 for the product 52 are identified. The coordinator 20 and purchaser 10 work together to compile a list of potential suppliers from suppliers already known to the purchaser 10 as well as suppliers recommended by the coordinator 20.

The purchaser 10 makes a decision regarding which potential suppliers 30 will receive invitations to the upcoming auction 56. Suppliers 30 that accept auction invitations are then sent notices regarding the upcoming auction 56. In certain situations, suppliers 30 may also receive software to install in preparation of participating in the auction 56.

In the RFQ phase 104 illustrated in FIG. 2, the coordinator 20 works with the purchaser 10 to prepare a Request for Quotation ("RFQ") 54. The coordinator 20 collects and maintains the RFQ data provided by purchaser 10, and then publishes the RFQ 54, and manages the published RFQ 54. The RFQ 54 includes specifications 50 for all of the products 52 covered by the RFQ 54. In the RFQ 54, the purchaser 10 may aggregate products into job "lots." The purchaser 10 may also separate unlike products into separate lots to best fit the needs of the purchaser 10 and the capabilities of suppliers 30. Lots, therefore, may include such things as aggregations of similar parts or products that are desired to be purchased together. That type of aggregation allows suppliers 30 to bid on that portion of the business for which they are best suited.

During the auction 56, bids 58 may be placed on individual lots (and their constituent parts 52) within the RFQ 54. While suppliers 30 may be required to submit actual unit prices for all line items, the competition in an auction 56 is generally based on the aggregate value bid for lots. The aggregate value bid for a lot depends upon the level and nix of line item bids and the quantity for each line item. Therefore, suppliers 30 may submit bids at the line item level, but is compete on the lot level.

In the Auction Administration phase 106, the coordinator 20 coordinates the auction 56 and administers the auction setup and preparation. The coordinator 20 sends an RFQ 54 to each participating supplier 30, and assists participating suppliers 30 to prepare for the auction 56.

In the Conduct Auction phase 108, suppliers 30 submit bids 58 on the lots and monitor the progress of the bidding by the participating suppliers 30. The coordinator 20 assists, observes, and administers the auction 56.

When the bidding period is over, the auction 56 enters the Administration of Auction Results phase 110. In that phase, the coordinator 20 analyzes and administers the auction results, which are viewed by the purchaser 10. The purchaser 10 begins to qualify the low bidding supplier 30 or suppliers 30. The purchaser 10 generally retains the right not to award business to a low bidding supplier 30 based on final qualification results or other business concerns.

In the ensuing Contract Administration phase 112, the coordinator 20 facilitates settlements 60 awarded by the purchaser 10 to suppliers 30. Contracts 62 are then drawn up between the purchaser 10 and suppliers 30.

The auction 56 is conducted electronically between potential suppliers 30 at their respective remote sites and the coordinator 20 at its site. As shown in FIG. 3, information is conveyed between the coordinator 20 and the suppliers 30 via a communications medium such as a network service provider 40 accessed by the participants through, for example, dial-up telephone connections using modems, or direct network connections. A computer system may be used to manage the auction 56. The computer system may have two components: a client component and a server component. The client component may operate on a computer at the site of each potential supplier 30 or may be accessed via a supplier computer. The client component is used by suppliers 30 to make bids during the auction 56. The bids are sent via the network service provider 40 to the site of the coordinator 20, where they are received by the server component of the software application.

The purchaser 10 may access the auction 56 through the auction coordinator 20 as illustrated in FIG. 3, or may alternately access the auction 56 through a network service provider 40.

In auctions 56, and in particular reverse auctions, it is desirable that bidder/suppliers 30 actively participate in the auction 56 by submitting lower bids on a regular basis throughout the duration of the auction 56. It is expected that each bidder 30 will consider factors including bids of the other bidders 30, their own costs, and potential efficiencies that may be had that will reduce the cost to the bidder 30 such that the bidder 30 may submit a reduced bid to the purchaser 10. In certain auctions 56, however, it has been discovered that certain bidders 30 hold back their bids until late in the time allotted for the auction 56. Other bidders 30 choose not to bid at all during the auction 56. A decision not to bid during an auction 56 may be made for many reasons. One reason for not bidding occurs when the bidder 30 is not desirous of being awarded a contract in the auction 56, but rather is gathering information, such as, for example, the price at which suppliers 30 are willing to provide goods and services. When bidders 30 hold their bids until late in the auction 56 or do not bid at all, the benefit of competitive bidding to the purchaser 10 is lost or reduced. Furthermore, purchasers 10 and bidders 30 alike may prefer to avoid providing such information to nonparticipants to protect the confidentiality of the auction 56.

Thus, there is a need for a system and process whereby bidders 30 are encouraged to place a bid 58. There is a further need for a system and process whereby bidders 30 are provided with an incentive to actively participate in an auction 56 by submitting additional, progressively lower bids 58 throughout the auction 56. There is also a need for a system and method of bidding that protects bidding confidentiality.

SUMMARY OF THE INVENTION

In accordance with various embodiments of the invention, systems, methods, and computer program products for advancing a first bidder to a desired rank in an electronic auction are disclosed. A first bidder actuates a bid rank advancement function. In response, a new bid for the first bidder is calculated by applying a predetermined minimum differential value to a current bid of a second bidder that holds the desired rank in the electronic auction. The new bid is automatically submitted to the electronic auction on behalf of the first bidder.

Accordingly, the present invention provides solutions to the shortcomings of prior online auctions. Those of ordinary skill in the art will readily appreciate, therefore, that those and other details, features, and advantages will become further apparent in the following detailed description of the preferred embodiments.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention.

In the drawings:

FIG. 2 is a tabular illustration of the tasks performed by the entities involved in the auction of FIG. 1;

FIG. 6 is a sample purchaser screen display that may be used to practice an embodiment of the invention;

FIG. 7 is a sample bidder screen display that may be used to practice the embodiment of the invention of FIG. 6;

FIG. 8 is another sample bidder screen display that may be used to practice the embodiment of the invention of FIG. 6;

FIG. 11 is a sample purchaser screen display that may be used to practice an embodiment of the invention;

FIG. 12 is a sample bidder screen display that may be used to practice the embodiment of the invention of FIG. 11;

FIG. 13 is another sample bidder screen display that may be used to practice the embodiment of the invention of FIG. 11;

FIG. 15 is another sample bidder screen display that may be used to practice the embodiment of the invention of FIG. 11; and FIG. 16 is another sample bidder screen display that may be used to practice the embodiment of the invention of FIG. 11.

DETAILED DESCRIPTION

Figure 1:
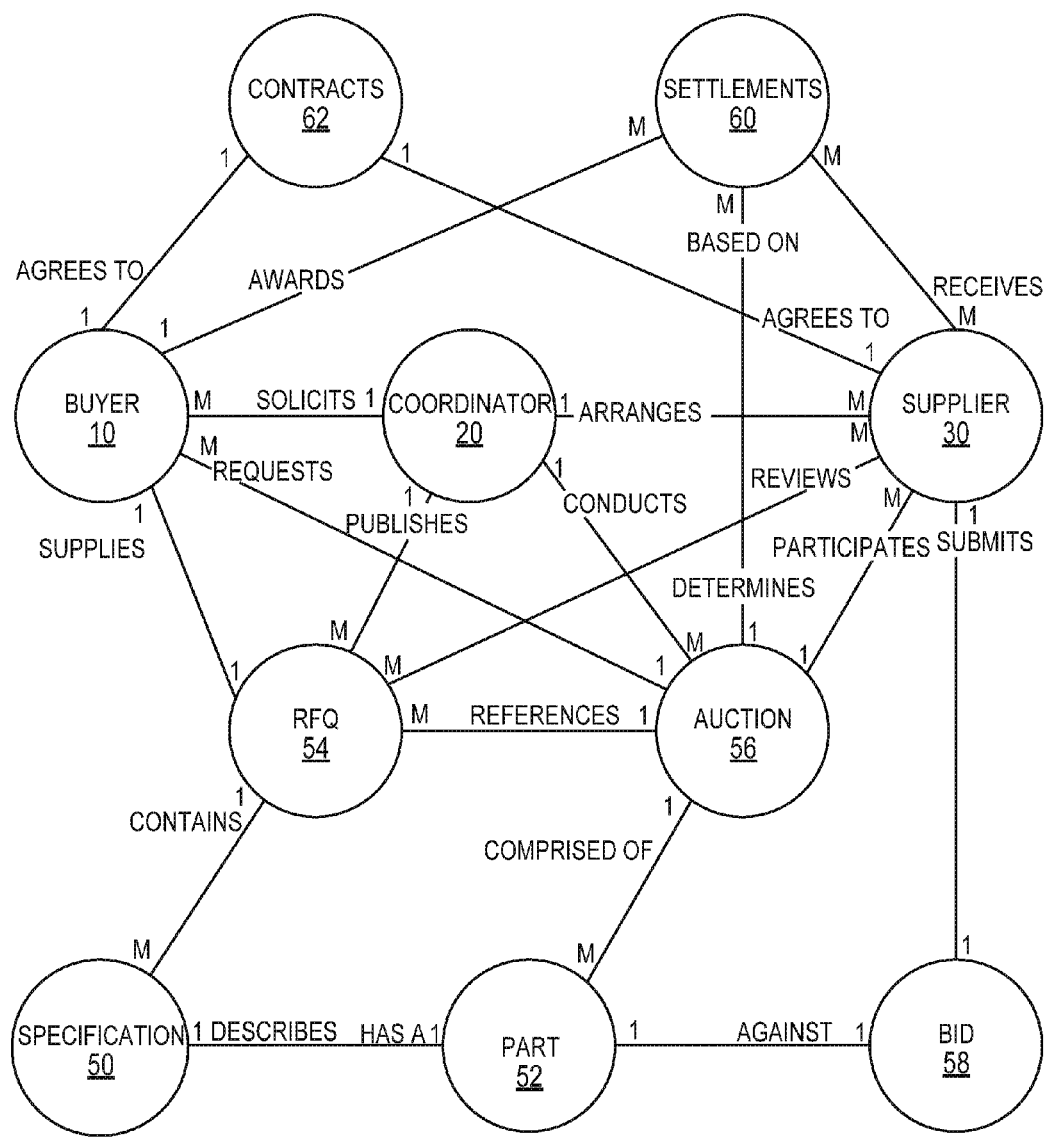
FIG. 1 is a schematic illustration of the elements and entities involved in an embodiment of an auction.
Figure 3:
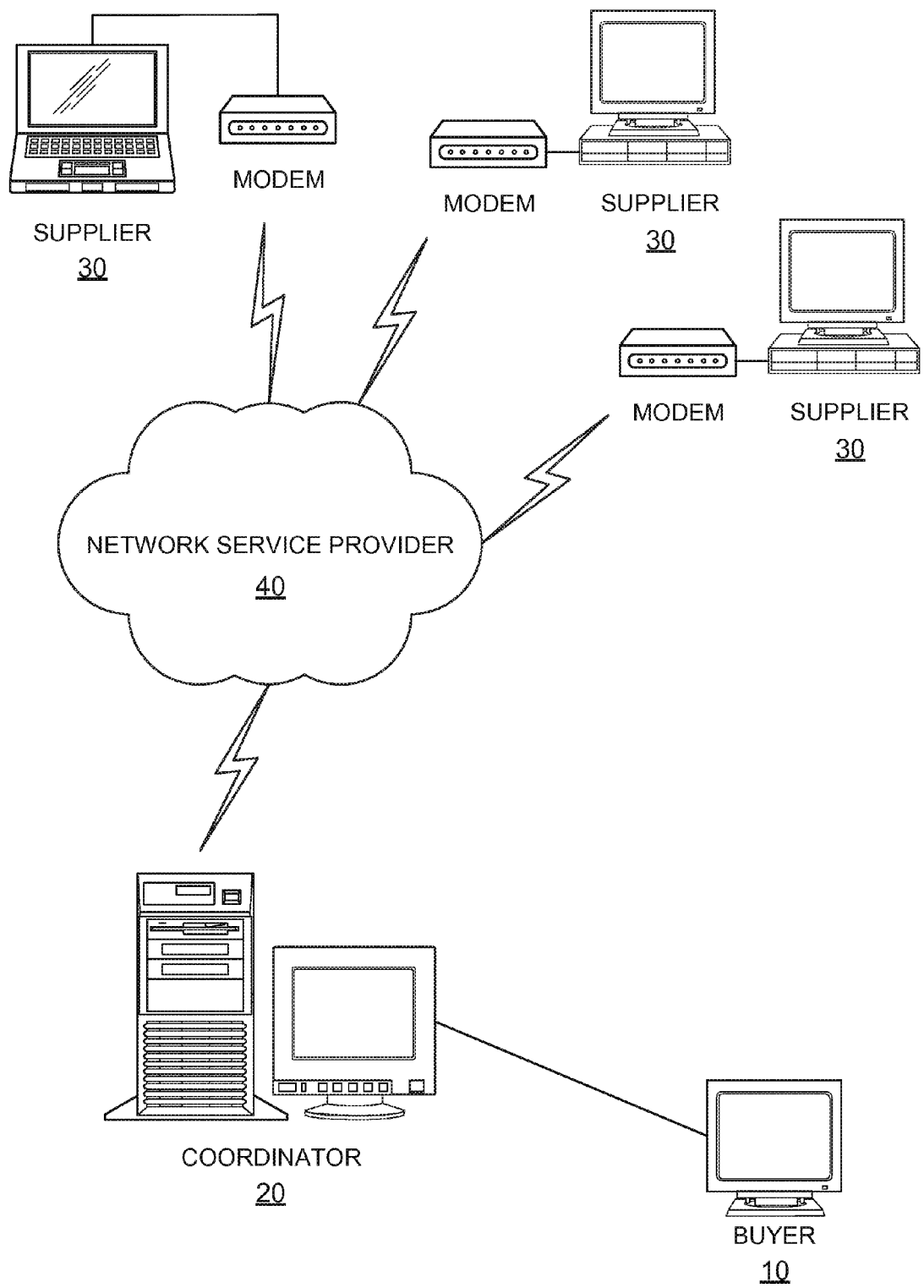
FIG. 3 is a schematic illustration of the communications links between the coordinator, the buyer, and the suppliers in the auction of FIG. 1.

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks. The present invention described below extends the operation of the inventive auction systems and methods described in greater detail in co-pending application Ser. No. 09/252,790, entitled "Method and is System for Controlling Closing Times of Electronic Auctions Involving Multiple Lots" filed Feb. 19, 1999, and co-pending application Ser. No. 09/282,157, entitled "Method and System for Conducting Electronic Auctions with Transformation Bidding" filed Mar. 31, 1999, the disclosures of which are hereby expressly incorporated in the present application.

The preferred embodiments described herein utilize an online reverse auction, wherein the present invention is performed by a computer processor, as an example. In those examples, suppliers 30 bid to supply goods or services to a purchaser 10 and the purchaser 10 typically purchases the goods or services from the lowest priced qualified bidder 30. It is to be understood, however, that the present invention may be used in other applications. The auction 56 would not necessarily have to occur online and the present invention may be performed by other than a computer processor. The present invention may also be utilized in connection with auctions other than reverse auctions. For example, the present invention may be advantageously utilized with forward auctions, wherein the party offering the highest priced qualified bid, rather than the lowest priced qualified bid, is awarded the goods or services being sold. In the case of a forward auction, the leading bid is the highest amount offered and the leading bidder 30 is the purchaser party 10 making that highest offer, while in a reverse auction, the leading bid is the lowest amount offered and the leading bidder 30 is the supplier party 30 making that lowest bid. Similarly, placing a "better bid" in a reverse auction indicates placing a lower bid, while placing a "better bid" in a forward auction indicates placing a higher bid.

Figure 4:
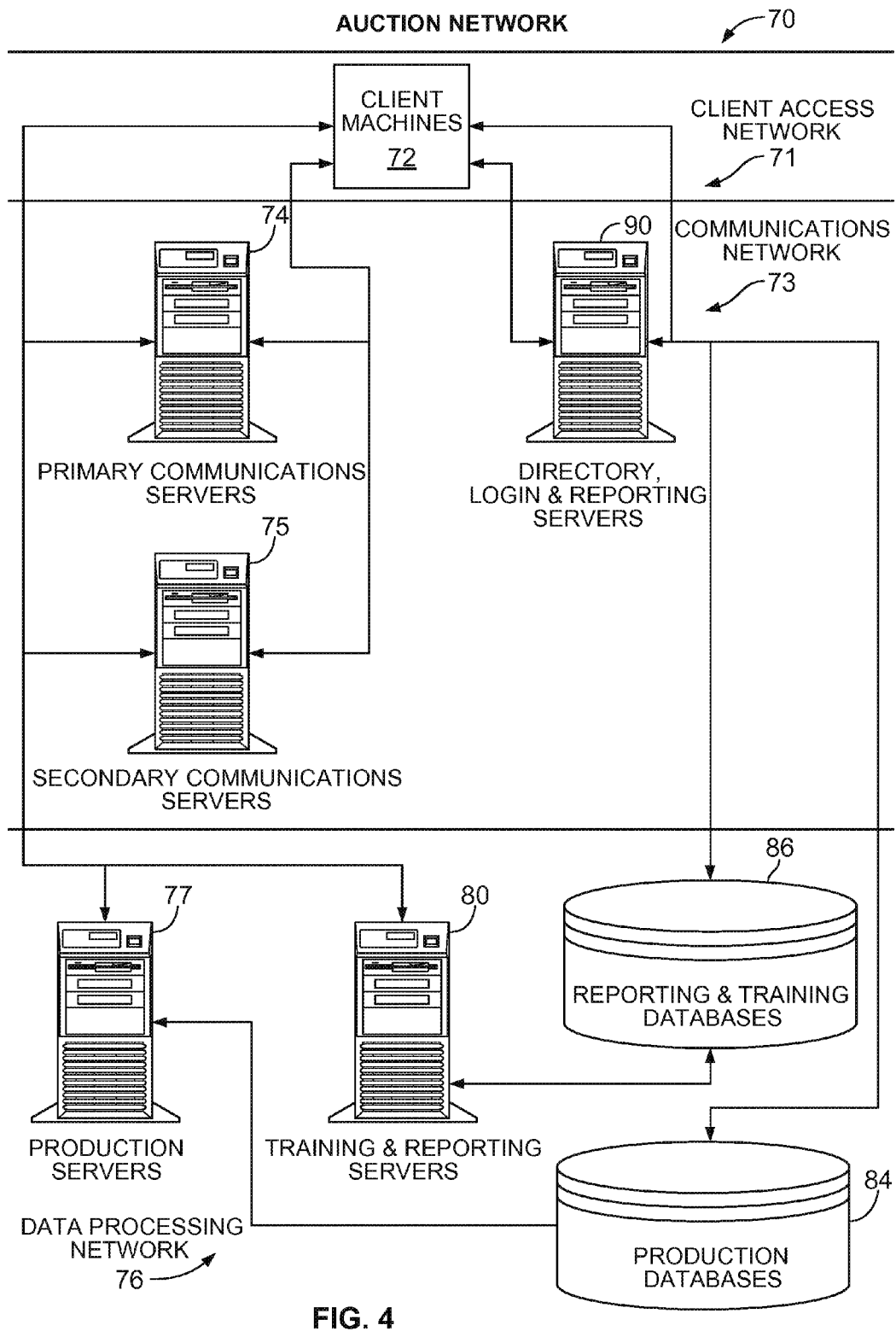
FIG. 4 is a schematic diagram of an auction network.

FIG. 4 is a diagram illustrating an auction network 70 of the present invention for operating an auction. The auction network 70 may be divided into three functional sections; a client access network 71, a communications network 73, and a data processing network 76. The client access network 71 may, for example, include one or more client machines 72 for accessing and communicating with the communications network 73. The communications network 73 may include one or more primary communications servers 74, secondary communications servers 75, and directory, login and reporting servers 90. The data processing network 76 may include production servers 77, training and reporting servers 80, reporting and training databases 86, and production databases 84. The production servers 77 and training and reporting servers 80 are is referred to collectively herein as bid servers 77 and 80.

The client machines 72 may be, for example, personal computers located at each bidder 30 and purchaser site 10 for accessing the auction 56. The client machines 72 may access the auction 56 by, for example, connecting to a web site operated by the party hosting the auction 56. The client machines 72 may also receive software from the communications network 73 that facilitates communications with the communications network 73.

The primary communications servers 74 are utilized to provide information to bids 58 received from the client machines 72 to the bid servers 77 and 80, and to provide that bid information from the bid servers 77 and 80 to the client machines 72. The primary communications servers 74 may furthermore act as a firewall to prevent direct access to the bid servers 77 and 80 by the client machines. The secondary communications servers 75 act as backups to the primary communications servers 74. The secondary communications servers 75 will perform the communication functions normally performed by the primary communications servers 74 if a failure occurs in the primary communications servers 74, thereby providing redundancy to the auction network 70.

The directory, login, and reporting servers 90 may perform a variety of functions that may be performed by a single server or include separate servers for the various functions. The directory, login, and reporting servers 90 may include a web server that acts as a portal for access to the auction network 70. As such, the directory, login, and reporting servers 90 will receive login requests for access to the auction network 70 via, for example, the Internet. The directory, login, and reporting servers 90 may make access decisions as to whether a client machine 72 is permitted to access the communications network 73. If access is permitted, the directory, login, and reporting servers 90 will direct the client machine 72 to the appropriate portion of the auction network 70. The directory, login, and reporting servers 90, may provide reports to client machines 72. For example, information from prior auctions 56 which may be utilized by purchasers 10 to make a decision as to which bidder 30 will be awarded the sale and to permit the purchaser 10 to consider the way in which the auction 56 proceeded so that future auctions 56 may be refined.

The production servers 77 run the bidding software that facilitates auctions 56 as they is occur. The production servers 77 may communicate with client machines 72 through primary and secondary communications servers 74 and 75. The production servers 77 may also be redundant so that if a failure occurs in the production server 77 that is being utilized in an auction event 56, the redundant backup production server 77 may perform the functions of the failed production server 77 and, thus, prevent failure of the auction 56.

The training and reporting servers 80 operate in a manner similar to the production servers 77 and provide reports for auctions 56. It is useful to operate test auctions 56 to test the operating systems and to train personnel and clients. Such testing may be performed on the production servers 77 or, to prevent any degradation of system operation in actual auctions 56, one or more separate training servers may be utilized for testing and training Reporting may also be accomplished on the production servers 77 or the report creation functions may be offloaded to one or more reporting servers 80. The reporting servers 80 may furthermore be combined with the training servers 80.

Data related to auctions 56 may be held in one or more storage devices. The data storage devices may, for example, be a magnetic storage device, a random access memory device (RAM), or a read only memory device (ROM). The data may include pre-auction data, post auction data, and data that is related to active auctions 56. Pre-auction data may include, for example, suppliers 30 that are permitted to bid on a particular auction 56 and the scheduled auction starting and ending times. Post auction data may include the bids and bid times received in a particular auction 56 and reports displaying that data in user friendly formats. Active auction data may include data received from the bidders 30 as the auction 56 is taking place and related data such as the rank of each bidder 30.

The "rank" of the bidders 30 is determined by comparing the lowest amount bid by each bidder 30 and ordering the bidders 30 according to those lowest bids. The bidder ranked first is the bidder 30 that has bid an amount lower than any other bidder 30 in a reverse auction. The last rank may be a rank equal to the number of bidders 30 who have submitted bids in the auction 56, and the bidder 30 having that last rank is the bidder 30 that has submitted the highest amount in a reverse auction that is based on price only. Of course, there are many known ways to calculate rank, and any of those may be used in connection with the subject invention. The other bidders 30 are ranked between first and last according to the amounts of their lowest submitted bids. Thus, a higher, or better ranked bidder 30 in a reverse auction is a bidder 30 who has placed a comparatively lower bid, while a higher, or better ranked bidder 30 in a forward auction is a bidder 30 who has placed a comparatively higher bid. An auction 56 may alternately be based on one or more factors other than price, such as quality, delivery factors, and/or other factors that are referred to herein collectively as "total value." Thus, rank may also be based on factors other than price, including total value and any other factor that is useful in an auction 56 setting. A bid or bid amount is a value that is submitted by each participating bidder 30 for comparison to the bids of other bidders 30, and may likewise be based on a variety of bid factors that are considered important to the bid participants. Those factors may include, for example, price, quality, other costs such as delivery costs, or a total value. Bids may also be placed in a number of ways including, for example, absolute total value, or comparative value such as bidding in relation to an index price.

Three databases, or groupings of databases, are incorporated into the auction network illustrated in FIG. 4. The production databases 84 hold data that will be used by or is received from the production servers 77, while the reporting and training databases 86 hold data that will be used by or is received from the training and reporting servers 80.

The directory, login, and reporting servers 90 illustrated provide a web portal for the client machines 72. The directory, login, and reporting servers 90 provide an initial contact point for the client machines 72, access to auctions 56 in which the client machine 72 is permitted to participate, and reports relating to active and closed auctions 56.

One skilled in the art will recognize that certain components of the network described herein, while beneficial to an auction network, are not necessary components in an operational auction network. For example, the secondary communications servers 75 could be removed where the benefit of redundancy is not desired, and the primary communications servers 74 could be removed and the client machines 72 could communicate directly with the bid servers 77 and 80.

In a business-to-business online auction 56, bidders 30 may compete openly using their identities, or anonymously wherein bidders 30 view bids 58 placed by other bidders 30 but do not know the identity of those other bidders 30. Feedback about bidding activity is referred to as "market feedback" and includes any information or data related to the bidders 30 or their bids or interrelationships between those bids, and any other bid related information or data such as, for example, the quality of goods being sold, that is received before or during the auction 56. Market feedback may include, for example, bids that have been placed by other bidders 30, the rank of a participants bid in relation to the other bidders 30, the identity of bidders 30 in relation to their bids or rank, or any subset of that information. Market feedback may also include non-pricing information such as, for example, the quality of the goods to be provided by bidders 30 and shipping costs associated with one or more bidders 30. Providing such market feedback to bidders 30 in an auction 56 helps create real-time competitive interaction among participants in the auction 56 because, without feedback, bidders 30 would have less incentive to revise their price quotes and place additional bids to remain competitive.

In a certain type of online auction 56, which may be referred to as "full market feedback format," all bids 58 are visible to every bidder 30. Bids 58 are sorted from highest to lowest. Thus, each bidder 30 can assess its rank and competitive position if bidders 30 are individually identified, by comparing its current best bid 58 with other bids 58 placed in the online auction 56.

In a second type of online auction 56, bidders 30 are provided with only their own current best bid 58 and the current market-leading bid. Bidders 30 are not aware of every bid 58 placed by other participants, but they can assess their competitive position against the current market-leading bid. In one variation of that second type of online auction 56. bidders 30 also receive feedback about their current rank.

Table 1 illustrates an example of a series of bids 58 placed by different bidders 30 participating in an online reverse auction 56. Each row includes information related to a single bid 58 and the rows are ordered from highest bid to lowest bid. In the example illustrated in Table 1, each bidder 30 is identified anonymously. The first column lists a bidder identifier that is used in connection with all bids submitted by a particular bidder 30. The second column lists the time the associated bid 58 was received and the third column lists the amount of bid 58. The fourth column indicates the dollar value difference between the bid 58 and the lowest current bid 58 ("market-leading bid") and the fifth column lists the percentage difference between the bid and the lowest current bid 58. The sixth column indicates the current rank of each bidder 30 next to the best bid 58 submitted by each bidder 30. Table 1 illustrates all of the bids 58 placed by every bidder 30.

TABLE 1

| A. All bids | | | Bids vs. Market Lead | | |
| --- | --- | --- | --- | --- | --- |
| Bidder | Bid Time | Bid | $ | % | Rank |
| Bidder A | 1:02:45 PM | $670,000 | $128,000 | 23.62% | |
| Bidder B | 1:01:23 PM | $664,000 | $122,000 | 22.51% | |
| Bidder C | 1:01:28 PM | $560,000 | $18,000 | 3.32% | |
| Bidder B | 1:03:10 PM | $559,000 | $17,000 | 3.14% | |
| Bidder D | 1:02:50 PM | $558,500 | $16,500 | 3.04% | 7 |
| Bidder A | 1:03:38 PM | $558,300 | $16,300 | 3.01% | 6 |
| Bidder E | 1:05:12 PM | $557,700 | $15,700 | 2.90% | 5 |
| Bidder F | 1:05:43 PM | $557,500 | $15,500 | 2.86% | |
| Bidder C | 1:06:49 PM | $552,000 | $10,000 | 1.85% | |
| Bidder G | 1:06:55 PM | $549,000 | $7,000 | 1.29% | |
| Bidder C | 1:07:22 PM | $546,800 | $4,800 | 0.89% | |
| Bidder F | 1:07:49 PM | $546,400 | $4,400 | 0.81% | 4 |
| Bidder C | 1:08:02 PM | $546,250 | $4,250 | 0.78% | 3 |
| Bidder B | 1:08:17 PM | $545,000 | $3,000 | 0.55% | 2 |
| Bidder G | 1:08:44 PM | $542,000 | $0 | 0.00% | 1 |

Applying the full market feedback format to the example illustrated in Table 1, each bidder 30 sees all of the information contained in Table 1 and is thus able to determine its rank and the difference between its best bid and the market-leading bid. For example, at 1:08:44 PM Bidder B can see that it is in second place, $3,000 above the market-leading bid placed by Bidder, G. Bidder F can see that it is in fourth place, $4,400 above the market-leading bid placed by Bidder G, $1,400 above Bidder B in second place, and $150 above Bidder C in third place.

Each bidder 30 also receives market feedback regarding all bids 58 placed up to that time throughout the auction 56 if the full market feedback format is utilized. Thus, at 1:04:00 PM, the market-leading bid 58 is held by Bidder A, who placed a bid of $558,300 at 1:03:38 PM. That bid, and all other bids placed prior to that time are visible to all bidders, including Bidder E, who at that point in the auction 56 has not placed a bid 58. By viewing the current market activity, Bidder E is able to formulate an appropriate first bid and submit a new market-leading, bid of $557,500 at 1:05:12 PM.

The full market feedback format is particularly effective for many industrial commodities and supply markets but may be utilized in any type auction 56. However, in certain auctions 56, particularly those conducted in industrial and business-to-business settings, that form of market feedback generates sub-optimal results or unwanted side-effects that damage the integrity of the process. For example, in certain auctions 56, the sponsor, which in the case of a reverse auction is typically the purchaser 10, may not want pricing information to be disclosed to a large number of parties to minimize the likelihood that the pricing information will be released to the public. A sponsor may also wish to conceal the number of bidders that are available or participating in the auction 56. In other auctions 56, disingenuous participants will watch the auction 56 without bidding. Qualified bidders 30 that claim to be interested in bidding may view the entire auction 56 without ever submitting a bid. Such participants learn market pricing, information, and auction results that may have value for general business purposes beyond the scope of the particular supply opportunity up for bid. For many business-to-business auctions 56, this is not a serious issue. For example, where the format of the auction 56 is such that bids are for aggregate "lots" of business consisting of many line items with individual unit prices, bidders 30 may compete at the lot level so that they see only aggregate or lot-level bids placed by other bidders 30 rather than the cost of each separate item being purchased. That severely limits the value of the pricing information certain bidders 30 are able to gather from watching the auction 56 because there is no way to deduce unit prices for separate items with any real accuracy. In certain other auctions 56, the items for bid are custom-engineered components or inputs specific to a particular purchaser 10 such that the pricing information is not readily transferable or useful in other business contexts.

For some auctions 56, however, especially where the bidding format reveals unit pricing is or the product is, for example, a commodity or standard item purchased by multiple purchasers 10, allowing visibility to market pricing is a more sensitive issue for the genuine participants. In those cases, genuine bidders 30 may be discouraged from submitting the lowest price quotes they are prepared to offer due to fear that disingenuous competitors may be viewing the auction 56 and may use information learned from the auction 56 against the genuine bidders 30 in the marketplace beyond the particular supply opportunity up for bid. In extreme cases, that fear may be sufficient to discourage certain bidders 30 from participating in the auction 56. For example, when a bidder 30 determines that the potential loss of the supply opportunity provided by the auction 56 is less damaging than the risk of damage that could occur to the entire base of business of the supplier 30 from revealing pricing information, the bidder 30 may opt not to participate in an auction 56 or not to price as aggressively in an auction 56 as the bidder 30 might otherwise. To guarantee full and aggressive participation, it is beneficial to assure bidders 30 that no bidders 30 are watching the auction 56 without actively participating themselves.

In certain other auctions 56, genuine participants may exploit market pricing learned from the auction 56. There are circumstances where the supply industry dynamic is such that, even when all bidders 30 intend to participate, some bidders 30 will fail to participate, or will offer less aggressive quotes than they otherwise would, for fear that they will reveal critical pricing information that will "leak" into the marketplace and damage their businesses. For example, a losing bidder 30 may learn the identity of the successful bidder 30 in a particular auction 56 through industry gossip. In a subsequent competitive selling situation that losing bidder 30 may inform another purchaser 10 of the pricing that the successful bidder 30 quoted in the previous auction 56. Thus, the winning bidder 30 is placed in an awkward position with subsequent purchasers 10 who may suspect that the successful bidder 30 had been supplying them with goods at a price higher than the bidder 30 was prepared to offer other customers. That situation may occur, for example, where (i) the bid format is structured to permit visibility to easily comparable pricing information (e.g., unit pricing); (ii) the commodity is a standard material purchased by multiple purchasers 10 (e.g., an industry standard grade of a particular chemical, such as 99% USP Food Grade Glycerin); and (iii) the industry structure is a consolidated "tight-knit" community where bidders 30 may learn the identity of the successful bidders 30 through market intelligence subsequent to the auction 56.

Another market feedback problem occurs in cases where bidders 30, such as preferred suppliers 30 or "incumbent suppliers" (i.e., bidders 30 that are current or past suppliers 30 to the purchaser 10) bid significantly behind the market leading bid. In an auction 56 for an industrial component or input, for example, purchasers 10 may reserve the right to award to a non-low-bidding supplier 30. That allows purchasers 10 to consider non-price factors, such as relationship history, service considerations, and location, that are material to establishing a supply contract with a particular bidder 30. While the lowest bidder 30 generally enjoys a favored position with respect to receiving the award, the purchaser 10 may be prepared to trade-off a higher price for other benefits. Similarly, preferred suppliers 30 may believe that they can offer significant non-price benefits beyond the specified requirements, and may choose to bid at a premium to the market-leading bid. While that may not be an illogical bidding strategy or undesirable market dynamic, in certain situations suppliers 30 may over-estimate the premium the purchaser 10 is willing to pay for perceived non-price benefits. That may lead preferred suppliers 30 to offer significantly less aggressive price quotes than they otherwise would if they realized how little value the purchaser 10 truly places on the non-price benefits. Thus, a preferred supplier 30 may not realize its tactical en-or until the purchaser 10 awards the business to a more competitive supplier 30. At that point, the auction 56 has closed and it is too late for the preferred supplier 30 to revise its bid to a lower value. The preferred supplier 30 will have, therefore, lost an opportunity to make a sale, and the purchaser 10 will also have lost the potential to award the sale to the preferred supplier 30 at a price within the expectation of the purchaser 10.

Another problem related to bidding behind the market occurs where incumbent suppliers 30 exploit market feedback to avoid competition. That problem may arise when a purchaser 10 selects a pricing structure, for example a fixed price or a differential price, that a non-incumbent supplier 30 must match or beat to be selected over an incumbent supplier 30. In such a case, for example, an incumbent supplier 30 could know that the purchaser 10 favors the incumbent supplier 30 even at a price premium to the market. Because the purchaser 10 may pass over low bidders 30, incumbent suppliers 30 can take advantage of their incumbent status. To ameliorate that disadvantage for new suppliers 30, it is common to communicate a "reserve price" to all bidders 30 prior to the auction 56. The reserve price represents the price at which the purchaser 10 will be willing to switch the business from the incumbent to a new source. Reserve price may be calculated in various ways including deducting the switching costs of the purchaser 10 from is the "historic price" that the incumbent is currently charging the purchaser 10. The use of such a reserve price affords new suppliers 30 an opportunity to offset the incumbent's advantage by ensuring that their bids are low enough for the purchaser 10 to recover any switching costs that Would otherwise prevent them from receiving the award.

In certain embodiments, the reserve price may be permitted to fluctuate when an incumbent bids an amount lower than the historic price. In such a situation, when an incumbent lowers its bid to less than the historic price, then the effective price required for a purchaser 10 to switch to a new supplier 30 will be lower than a reserve price that was a fixed amount below the historic price. Since an incumbent may calculate the differential between reserve and historic prices when the reserve price fluctuates, and can view the low bid, the incumbent can exploit its position by bidding behind the market by an amount slightly less than the differential between the historic and reserve prices. While being a reasonable rationale for the incumbent, that situation does not allow the purchaser 10 to maximize the competitive dynamic between incumbent and potential new suppliers 30. In addition, new suppliers 30 often perceive this situation to be unfair because they are unable to identify an incumbent when bidding is anonymous.

It may thus be beneficial to reward more aggressive bidders 30 with more information about bidding activity in certain circumstances (i.e., the closer a bidder's 30 current bid is to the market-leading bid, the more information about other bids placed in the market is provided to that bidder 30). The present invention includes improved online auction technology that allows market feedback to be made visible to each bidder 30 according to that bidder's level 30 of participation and relative position in the market ("differential market feedback").

"Differential market feedback technology" includes a variety of feedback mechanisms that may be used to differentiate bidders 30 while "differential market feedback rules" are used to define when a bidder 30 can view market feedback and may use differential market feedback technology in that determination. An example of differential market feedback technology as it is used to measure the market position of each bidder 30 relative to all other bidders 30 involves comparing the highest bid of each bidder 30 to the current market-leading bid. Examples of differential market feedback technology as it is used to measure market position relative to fixed reference points include ranking each bidder 30, calculating the percentage differential between is the bids of two or more bidders 30, and calculating the absolute differential between the bids of two or more bidders 30. Market position may also be determined relative to a fixed reference point by comparing each bid to a reserve price selected by the purchaser 10 or a historic price paid by the purchaser 10 in the past.

Differential market feedback rules may include consideration of factors including level of market participation and market position. Market participation can be measured, for example, by whether the bidder 30 has submitted a bid at all, or by whether the bidder 30 has submitted a bid within a pre-determined time period between current time and the last time a bid was placed by that bidder 30. Market position can be measured, for example, relative to other bids in the auction 56 or relative to a fixed reference point. Other known methods of measuring market participation and market position are known to those skilled in the art and are intended to be encompassed by the present invention.

Differential market feedback rules may also take into consideration the relative positioning of bidders 30 as determined by the differential market feedback technology. Depending on the participation and position of a bidder 30, the bidder 30 may, for example, be provided no feedback as to the market, the rank of the bidder 30, information regarding only bids that are greater than (worse than) the lowest bid of that bidder 30, information regarding the next lowest bid to the best bid placed by the bidder 30, information regarding the market-leading bid, or information regarding all bids placed.

By combining feedback rules and feedback types, an auction 56 may utilize a differential market feedback format uniquely suited to the requirements of each auction 56, wherein the differential market feedback technology dynamically adjusts the feedback visible to each bidder 30 depending on their position in the auction 56 and other factors.

Figure 5:
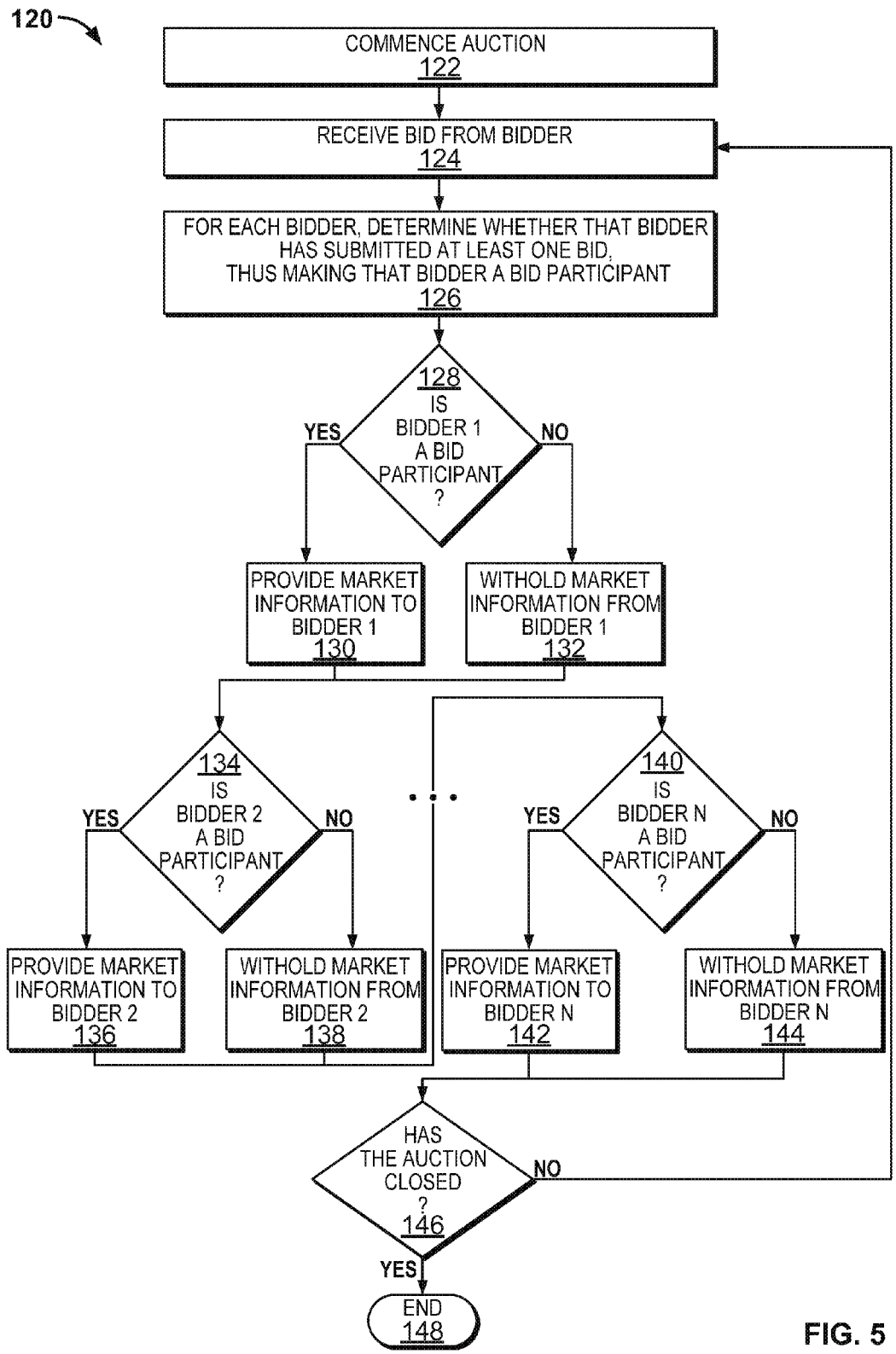
FIG. 5 is a flow diagram illustrating an information flow of the present invention.

FIG. 5 is a flow diagram 120 illustrating an embodiment of the present invention wherein access to market feedback is restricted to those bidders 30 who have submitted at least one valid bid. This example, and other examples provided herein, assume that a computer processor is executing a set of instructions that perform the steps, however, it will be recognized by one skilled in the art that the instructions may be carried out by any known method. At 122 of the embodiment illustrated in FIG. 5, the auction 56 is commenced by accepting bids from the bidders 30. The auction 56 normally begins at a scheduled time that has been prearranged by the auction coordinator 20, the purchaser 10 and the bidders 30. At 124 a bid is received from any bidder 30 participating in the auction 56. That bid, as well as any other bid discussed herein, may be a bid that is created by a bidder 30 and submitted to the data processing network 77 from the client machine 72 by way of the communication network 53. At 126 the processor determines which bidders 30 have submitted at least one bid and, for example, sets a flag identifying those bidders 30 as "bid participants."

At 128 through 144, an example is provided of the bid participant segment of this embodiment, wherein market feedback is provided only to those bidders 30 who have placed at least one bid and are, thus, bid participants. In that example, "n" represents the number of bidders 30 that are permitted by the auction coordinator 20 to participate in the auction 56. At 128, the processor checks to see whether Bidder one is a bid participant. At 130, market feedback is provided to Bidder one if Bidder one is a bid participant and at 132, market feedback is withheld from Bidder one if Bidder one is not a bid participant.

Similarly, at 134, the processor checks to see whether Bidder two is a bid participant. At 136, market feedback is provided to Bidder two if Bidder two is a bid participant and at 138, market feedback is withheld from Bidder two if Bidder two is not a bid participant. The processor will continue by considering the bid participant status of each bidder 30 and provide market feedback to only those bidders 30 who are bid participants. At 140, the processor checks to see whether the last bidder 30 (Bidder n) is a bid participant. At 142, market feedback is provided to Bidder n if Bidder n is a bid participant and at 144, market feedback is withheld from Bidder n if Bidder n is not a bid participant.

After the bid participant segment has been completed, the processor will determine whether the auction closing time has arrived at 146. If the auction closing time has not arrived, the processor will return to 124 to receive additional bids. Each time a new bid is received the processor will update the bid participant status of the bidders 30 and provide market feedback to all bid participants. If the auction closing time has arrived, the auction 56 will close and no additional bids will be accepted.

Additional conditions may be placed on a bidder 30 prior to permitting the bidder 30 to access market feedback. As an example of one condition, any bidder 30 that places a non-competitive bid, (i.e., a bid in excess of a predetermined amount in a reverse auction) is not permitted to view market feedback until that bidder 30 places a competitive bid. Such a competitive bid may include a bid that is less than a predetermined amount in a reverse auction and a bid that is greater than a predetermined amount in a forward auction. Alternately or in addition, a bidder 30 who is receiving market feedback may stop receiving market feedback if an extended period of time has elapsed since that bidder 30 placed its last bid, or if the bid is determined to be invalid. Another method of assuring that each bidder 30 places at least one competitive bid, is to require each bidder to submit and commit to such a competitive bid prior to commencement of the auction 56. The auction 56 may then begin by having the auction coordinator 20 enter those bids into the auction network 70.

Figure 7:
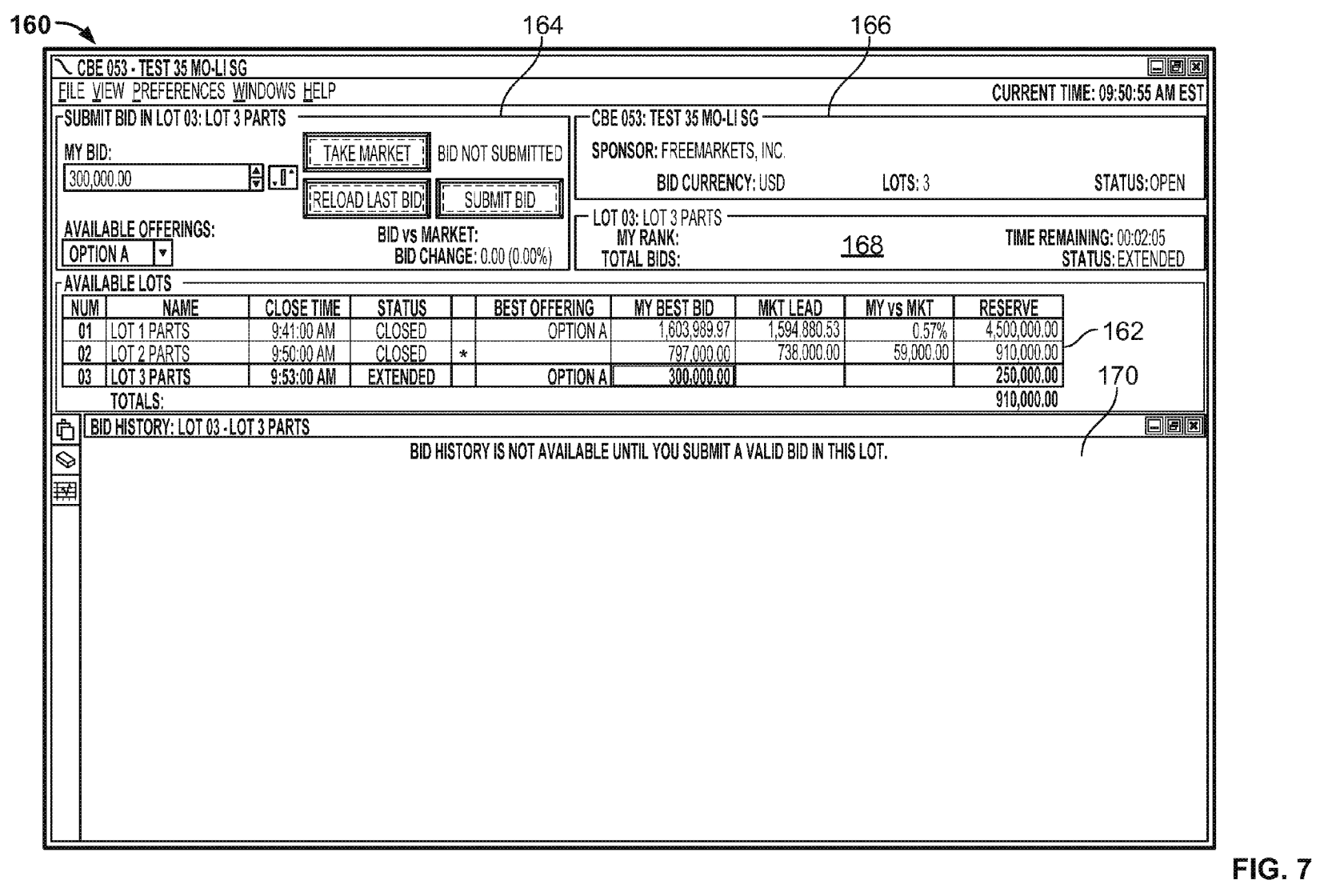

FIGS. 6-8 illustrate sample screens that may be displayed for various participants in a particular auction 56 utilizing the rule that access to market feedback is restricted to those bidders 30 who have submitted at least one bid. FIG. 6 illustrates a sample of a screen 150 that may be displayed to the purchaser 10. A lot listing 152 includes statistics related to three lots of parts that are being auctioned. Lot three is highlighted in the lot listing 152, indicating that lot three is active in the rest of the screen 150. At 154, statistics for all three lots are displayed and at 156 additional statistics for lot three are displayed. A bid history 158, listing bids received for lot three, is also provided because lot three is the active lot. The lot three bid history 158 is arranged from the highest bid amount to the lowest amount bid.

FIG. 7 illustrates a sample of a screen 160 that may be displayed to a bidder 30 who has not submitted a valid bid for lot three during the course of the auction 56. At 162, statistics regarding the market, or bids placed by other bidders 30, are provided in connection with lots one and two only. The bidder 30 is provided with a bid submission area 164, with which a bid may be formulated and submitted. The bidder 30 is also provided with a general status area 166 and a lot specific status area 168, that includes information related to active lot three. It will be noted that the rank and total bids statistics are blank in FIG. 7 because the bidder 30 viewing FIG. 7 has not submitted a bid for lot three. At bid history area 170, the bid history is provided if the bidder 30 viewing screen 160 had placed a valid bid. Because the bidder 30 has not placed a bid, however, a message stating "bid history is not available until you submit a valid bid in this lot" is displayed in the bid history area 170.

FIG. 8 illustrates a sample of a screen 180 that may be displayed to a bidder 30 who has submitted a valid bid for lot three during the course of the auction 56. At lot listing 182, statistics regarding the market or bids placed by other bidders 30 are provided in connection with lots one and two and three because the viewing bidder 30 has placed at least one valid bid for each of those lots. At bid submission area 184, the bidder 30 is provided an area from which a bid may be formulated and submitted. At 186, the bidder 30 is provided with a general status area and at 188 a status area for lot three, which is active because it is selected at 162, is provided. It will be noted that the rank and total bids fields are displayed in FIG. 8 because the bidder 30 viewing FIG. 8 has submitted a valid bid for lot three. At 190 the bid history, including the amount of every bid placed and identifier for each bidder 30 is provided.

Example 1

The embodiment of the invention depicted in FIGS. 5-8 may also be illustrated by reference to Tables 1 through 5. In that embodiment, market feedback is provided to only those participants who have placed a valid bid. That prevents disingenuous participants from watching the auction 56 to gather pricing intelligence without placing a bid themselves and forces participants to take some risk by submitting a bid before they are able to view market feedback. That embodiment also discourages bidders 30 from waiting until the last moment to place a bid because no competitive information regarding the bid is available to a bidder 30 until that bidder 30 submits its first bid.

Referring to the bidding activity shown in Table 1, at 1:04:00 PM, Bidders A, B, C, and D have submitted bids into the auction 56, while Bidders E, F and G have not. Accordingly, in the current embodiment, market feedback would only be made available to Bidders A, B, C, and D at 1:04:00 PM, and those bidders 30 would view all bids placed by all bidders 30 at that time. Thus, the information provided to Bidders A, B, C, and D at 1:04:00 PM would appear as shown in Table 2.

TABLE 2

| 1. Market Participants Only | | | Bids vs. Market Lead | | |
|---|---|---|---|---|---|
| Bidder | Bid Time | Bid | $ | % | Rank |
| Bidder A | 1:02:45 PM | $670,000 | $112,300 | 20.14% | |
| Bidder B | 1:01:23 PM | $664,000 | $106,300 | 19.06% | |
| Bidder C | 1:01:28 PM | $560,000 | $2,300 | 0.41% | 4 |
| Bidder B | 1:03:10 PM | $559,000 | $1,300 | 0.23% | 3 |
| Bidder D | 1:02:50 PM | $558,500 | $800 | 0.14% | 2 |
| Bidder A | 1:03:38 PM | $558,300 | $600 | 0.11% | 1 |

Bidders E, F and G would not receive any market feedback at 1:04:00 PM. Thus, the information provided to Bidders E, F, and G at 1:04:00 PM would appear as shown in Table 3.

TABLE 3

| 1. Market Participants Only | | Bids vs. Market Lead | | |
|---|---|---|---|---|
| Bid Time | Bid | $ | % | Rank |
| Not bid history is available until a bid has been submitted. | | | | |

Again referring to Table 1, at 1:05:12 PM, Bidder E placed a bid of $557,700. As soon as that bid is submitted, Bidder E receives full feedback of all bids placed in the market. In this instance, Bidder E has placed a new market-leading bid, although this is not apparent to Bidder E until after the bid has been submitted. Thus, Bidder E and Bidders A, B, C, and D would see the bid history shown in Table 4 after the 1:05:12 PM bid has been submitted and Bidder E would realize lie has submitted the market-leading bid.

TABLE 4

| 1. Market Participants Only | | | Bids vs. Market Lead | | |
|---|---|---|---|---|---|
| Bidder | Bid Time | Bid | $ | % | Rank |
| Bidder A | 1:02:45 PM | $670,000 | $112,300 | 20.14% | |
| Bidder B | 1:01:23 PM | $664,000 | $106,300 | 19.06% | |
| Bidder C | 1:01:28 PM | $560,000 | $2,300 | 0.41% | 5 |
| Bidder B | 1:03:10 PM | $559,000 | $1,300 | 0.23% | 4 |
| Bidder D | 1:02:50 PM | $558,500 | $800 | 0.14% | 3 |
| Bidder A | 1:03:38 PM | $558,300 | $600 | 0.11% | 2 |
| Bidder E | 1:05:12 PM | $557,700 | $— | 0.00% | 1 |

In this embodiment, once a bidder 30 has placed a bid, that bidder 30 is entitled to continue to see all bid history for the remainder of the auction 56 regardless of whether they submit any additional bids. Hence, at the end of the auction 56 at 1:09:00 PM, Bidder E will view the bid history shown below in Table 5, even though Bidder E had not place any additional bids.

TABLE 5

| 1. Market Participants Only | | | Bids vs. Market Lead | | |
|---|---|---|---|---|---|
| Bidder | Bid Time | Bid | $ | % | Rank |
| Bidder A | 1:02:45 PM | $670,000 | $128,000 | 23.62% | |
| Bidder B | 1:01:23 PM | $664,000 | $122,000 | 22.51% | |
| Bidder C | 1:01:28 PM | $560,000 | $18,000 | 3.32% | |
| Bidder B | 1:03:10 PM | $559,000 | $17,000 | 3.14% | |
| Bidder D | 1:02:50 PM | $558,500 | $16,500 | 3.04% | 7 |
| Bidder A | 1:03:38 PM | $558,300 | $16,300 | 3.01% | 6 |
| Bidder E | 1:05:12 PM | $557,700 | $15,700 | 2.90% | 5 |
| Bidder F | 1:05:43 PM | $557,500 | $15,500 | 2.86% | |
| Bidder C | 1:06:49 PM | $552,000 | $10,000 | 1.85% | |
| Bidder G | 1:06:55 PM | $549,000 | $7,000 | 1.29% | |
| Bidder C | 1:07:22 PM | $546,800 | $4,800 | 0.89% | |
| Bidder F | 1:07:49 PM | $546,400 | $4,400 | 0.81% | 4 |
| Bidder C | 1:08:02 PM | $546,250 | $4,250 | 0.78% | 3 |
| Bidder B | 1:08:17 PM | $545,000 | $3,000 | 0.55% | 2 |
| Bidder G | 1:08:44 PM | $542,000 | $— | 0.00% | 1 |

It should be noted that in example one and the following examples, the term "rank" indicates rank of bidders. Alternately, rank may be based on bids such that the bid placed by Bidder C at 1:07:22 PM in Table 5 would be ranked fifth.

Example 2

In another embodiment, a bidder 30 will not view any market feedback unless the current best bid of that bidder 30 is within a group of "market leaders." Whether a bid qualifies the submitting bidder 30 as a market leader may be determined in many ways including, for example, a bidder 30 may be a market leader when that bidder 30 places a bid that is within no more than a predetermined percentage behind the market-leading bid. For example, the bidder 30 may be provided with market feedback as long as the lowest bid of that bidder 30 is no more than 2% behind the market-leading bid. Alternately, a bid may be considered a market leader if the lowest bid of that bidder 30 ranks no more than a specified number of places behind the market-leading bid. For example, the bidder 30 may be provided with market feedback as long as the lowest bid of that bidder 30 is one of the top three bids. In yet another alternative, a bid may be considered a market leader if the lowest bid of that bidder 30 is within no more than a predetermined absolute value behind the market-leading bid; for example, no more than $10,000 behind the market-leading bid.

In the market leader embodiments, bidders 30 may view market feedback only as long as their bid remains within the market-leading group of bids. The first time a bidder 30 submits a bid within the market-leading group, they will be able to view market feedback. Up until that point (or if a bidder 30 does not submit a bid at all), no market feedback will be provided to that bidder 30. If, in the course of the auction 56, a bidder 30 falls out of the market-leading group because other bidders 30 have exceeded the rank of bidder 30, the market feedback may not be updated for that bidder 30 from the point in time at which that bidder 30 fell out of the market-leading group. That is, the market feedback will freeze at that point and will not be updated until that bidder 30 regains a market-leading position. In this example, if the bidder 30 places another bid and regains a market-leading position, the market feedback for that bidder 30 will be updated to include all bids placed to that point in time, including the bids placed while the bidder 30 was out of the market-leading group. Hence, a bidder 30 might gain, lose, and re-gain visibility to market feedback many times during the course of an auction 56 depending on the competitive interaction between all of the bidders 30.

The market leader format rewards the most aggressive bidders 30 with the most pricing information from the auction 56 and prevents non-participating or uncompetitive bidders 30 from learning pricing information. It limits the disclosure of final auction results to all but the most aggressive bidders 30, decreasing the risk to the market leaders that valuable pricing information will "leak out" to a broader marketplace. The decision about how to define the market-leading group can be used by the auction coordinator 20 as a strategic signal to all bidders 30 about the intentions of the purchaser 10 with respect to awarding the business. E.g., defining market leaders as the top three bidders 30 might be used as a signal that the award will go to one of the top three bidders 30. That might, in turn, drive more aggressive bidding by all bidders 30. Even incumbents are encouraged to stay in the top three ranked bidders 30 to avoid the risk of being so far behind the leaders that the purchaser 10 can comfortably justify the switching costs of moving the business.

Figure 9:
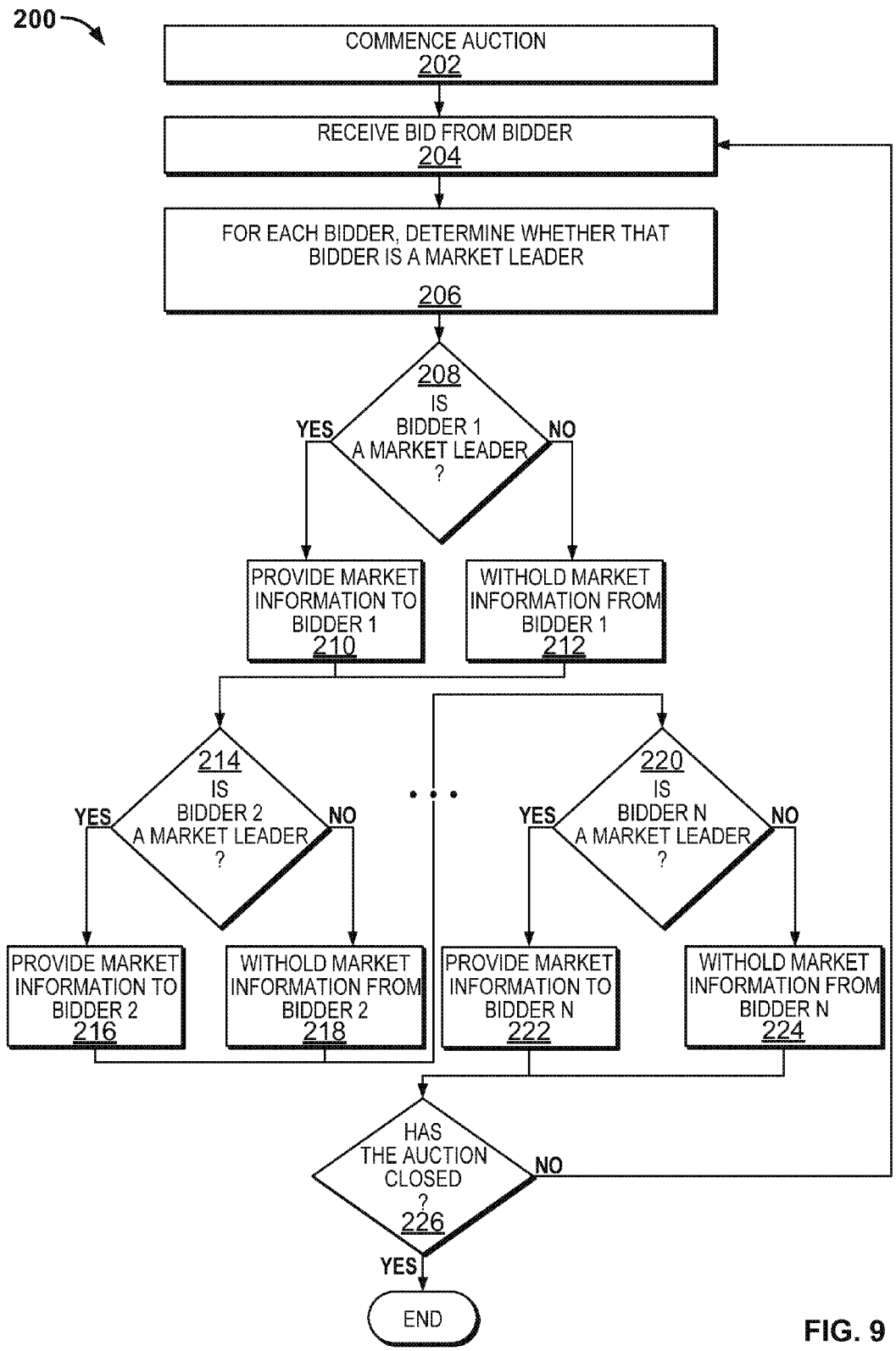
FIG. 9 is a flow diagram illustrating another information flow of the present invention.

FIG. 9 is a flow diagram 200 illustrating an embodiment of the present invention wherein access to market feedback is restricted to those bidders 30 who are market leaders. At 202 of the embodiment illustrated in FIG. 9, the auction 56 commences by accepting bids from the bidders 30. At 204, a bid is received from any bidder 30 participating in the auction 56. At 206, the processor determines which bidders 30 are market leaders based on predetermined conditions such as the differential market feedback technology and the differential market feedback rules. The processor may then set a flag identifying the market leading bidders 30 as such.

At 208 through 224, an example is provided of the bid participant segment wherein market feedback is provided only to market leading bidders 30. In that example, "n" represents the number of bidders 30 that are permitted by the auction coordinator to participate in the auction 56. At 208, the processor checks to see whether Bidder one is a market leader. At 210, market feedback is provided to Bidder one if Bidder one is a market leader and at 212, market feedback is withheld from Bidder one if Bidder one is not a market leader.

Similarly, at 214, the processor checks to see whether Bidder two is a market leader. At 216, market feedback is provided to Bidder two if Bidder two is a market leader and at 218, market feedback is withheld from Bidder two if Bidder two is not a market leader. The processor will continue to consider the market leading status of each bidder 30 and provide market feedback to only those bidders 30 who are market leaders. At 220, the processor checks to see is whether the last bidder 30 (Bidder n) is a market leader. At 222, market feedback is provided to Bidder n if Bidder n is a market leader and at 144, market feedback is withheld from Bidder n if Bidder n is not a market leader.

After the bid participant segment has been completed, the processor will determine whether the auction closing time has arrived at 226. If the auction closing time has not arrived, the processor will return to 204 to receives any additional bids that have been received. Each time a new bid is received the processor will update the market leading status of the bidders 30 and provide market feedback to all market leaders. If the auction closing time has arrived, the auction 56 will close and no additional bids will be accepted.

Consider again the sequence of bidding activity in Table 1, assuming this time that the market leader format is being used such that bidders 30 must to be within 2% of the market-leading bid to view bidding activity. At 1:04:00 PM, Bidder E does not receive any market feedback because Bidder E has not yet placed any bids. Thus, the view of the market by Bidder E at 1:04:00 PM, is as shown in Table 6.

TABLE 6

| 2. Market Participants Only | | Bids vs. Market Lead | | | |
|---|---|---|---|---|---|
| Bidder | Bid Time | Bid | $ | % | Rank |
| Not bid history is available until a bid has been submitted. | | | | | |

At 1:05:12 PM, Bidder E places a bid of $557,700, which is a new market-leading bid. After that bid has been placed, Bidder E is provided all permitted market feedback Lip until that point including all the bidding activity that had not previously been provided to Bidder E. Bidder E would see the bid history shown in Table 7 after the 1:05:12 PM bid is received.

TABLE 7

| 3. Market Leaders Only | | | Bids vs. Market Lead | | |
|---|---|---|---|---|---|
| Bidder | Bid Time | Bid | $ | % | Rank |
| Bidder A | 1:02:45 PM | $670,000 | $112,300 | 20.14% | |
| Bidder B | 1:01:23 PM | $664,000 | $106,300 | 19.06% | |
| Bidder C | 1:01:28 PM | $560,000 | $2,300 | 0.41% | 5 |
| Bidder B | 1:03:10 PM | $559,000 | $1,300 | 0.23% | 4 |
| Bidder D | 1:02:50 PM | $558,500 | $800 | 0.14% | 3 |
| Bidder A | 1:03:38 PM | $558,300 | $600 | 0.11% | 2 |
| Bidder E | 1:05:12 PM | $557,700 | $— | 0.00% | 1 |

Bidder E is in a position to continue to view all bids placed by all bidders 30 unless and until the current best bid of Bidder E falls more than 2% behind the market-leading bid. Thus, Table 8 illustrates the market feedback that is provided to Bidder E at 1:07:22 PM because at that time, the best bid of Bidder E is within 2% of the market leading bid.

TABLE 8

| 2. Market Leaders Only | | | Bids vs. Market Lead | | |
|---|---|---|---|---|---|
| Bidder | Bid Time | Bid | $ | % | Rank |
| Bidder A | 1:02:45 PM | $670,000 | $128,000 | 23.62% | |
| Bidder B | 1:01:23 PM | $664,000 | $122,000 | 22.51% | |
| Bidder C | 1:01:28 PM | $560,000 | $18,000 | 3.32% | |
| Bidder B | 1:03:10 PM | $559,000 | $17,000 | 3.14% | |
| Bidder D | 1:02:50 PM | $558,500 | $16,500 | 3.04% | 7 |

TABLE 8-continued

| 2. Market Leaders Only | | | Bids vs. Market Lead | | |
|---|---|---|---|---|---|
| Bidder | Bid Time | Bid | $ | % | Rank |
| Bidder A | 1:03:38 PM | $558,300 | $16,300 | 3.01% | 6 |
| Bidder E | 1:05:12 PM | $557,700 | $15,700 | 2.90% | 5 |
| Bidder F | 1:05:43 PM | $557,500 | $15,500 | 2.86% | |
| Bidder C | 1:06:49 PM | $552,000 | $10,000 | 1.85% | |
| Bidder G | 1:06:55 PM | $549,000 | $7,000 | 1.29% | |
| Bidder C | 1:07:22 PM | $546,800 | $4,800 | 0.89% | |
| Bidder F | 1:07:49 PM | $546,400 | $4,400 | 0.81% | 4 |
| Bidder C | 1:08:02 PM | $546,250 | $4,250 | 0.78% | 3 |
| Bidder B | 1:08:17 PM | $545,000 | $3,000 | 0.55% | 2 |
| Bidder G | 1:08:44 PM | $542,000 | $— | 0.00% | 1 |

In the example illustrated in FIG. 8, Bidders C, F, and G have all bid below the original bid placed by Bidder E. Bidder E has not responded with any additional bids and so now ranks in fourth place, $10,900 behind the current low bid placed by Bidder C. The bid submitted by Bidder E, however, is only 1.99% higher than that of Bidder C who holds the market-leading bid of $546,800 at 1:07:22 PM.

However, consider what occurs at 1:07:49 PM when Bidder F places a new market-leading bid of $546,400 into the auction 56. At that point in time, Bidder E's current best bid is $11,300 or 2.07% behind the market-leading bid. Because the price differential between Bidder E and the market-leading bid is more than the 2% differential required to stay within the market-leading group of bidders 30, Bidder E receives one final update of bid history alerting Bidder E to the fact that no further feedback will be made available to Bidder E until Bidder E submits a lower bid within 2% of the current low bid. Thus, Table 9 illustrates the market feedback that is provided to Bidder E at 1:07:49 PM because at that time, the best bid of Bidder E is no longer within 2% of the market leading bid.

TABLE 9

| 2. Market Leaders Only | | |
|---|---|---|
| Bidder | Bid Time | Bid |
| Bidder A | 1:02:45 PM | $670,000 |
| Bidder B | 1:01:23 PM | $664,000 |
| Bidder C | 1:01:28 PM | $560,000 |
| Bidder B | 1:03:10 PM | $559,000 |
| Bidder D | 1:02:50 PM | $558,500 |
| Bidder A | 1:03:38 PM | $558,300 |
| Bidder E | 1:05:12 PM | $557,700 |
| Bidder F | 1:05:43 PM | $557,500 |
| Bidder C | 1:06:49 PM | $552,000 |
| Bidder G | 1:06:55 PM | $549,000 |
| Bidder C | 1:07:22 PM | $546,800 |
| No further bid history is available until a bid within 2% of the market leading bid has been submitted. | | |

After 1:07:49 PM, Bidder E may only view more bid history if Bidder E places a new lower bid within 2% of the market-leading bid. In this example, while the bidding continued until 1:08:44 PM, Bidder E did not re-bid at any time so Bidder E did not receive any further feedback about the market-leading bidding activity in the auction 56.

In the example illustrated in Tables 7-9, Bidder E did not receive updates about rank or the differential (in dollars or percentage) from the market leading bid after 1:07:22 PM. That prevents Bidder E from learning any more information about recent market activity. Alternative implementations of the format illustrated in Tables 7-9 could allow rank and/or differentials information to be continuously updated depending on the degree to which the auction coordinator 20 wishes to limit disclosure of market leading bidding activity to non-market leaders.

Example 3

We will now consider how the same auction 56 will be viewed by Bidder E if the market leader format is used such that bidders 30 had to be ranked within the top three in order to view is bidding activity. Again, as shown in Table 10, at 1:04:00 PM, Bidder E would not receive any market feedback because Bidder E has not placed bid.

TABLE 10

| 3. Market Leaders Only | | | Bids vs. Market Lead | | |
|---|---|---|---|---|---|
| Bidder | Bid Time | Bid | $ | % | Rank |
| Not bid history is available until a bid has been submitted. | | | | | |

At 1:05:12 PM, Bidder E places a bid of $557,700, which is a new market-leading bid such that Bidder E is ranked first. Because that rank is at least third, Bidder E is entitled to view all bid history Up until that point. Bidder E, therefore, is provided with the history shown in Table 11.

TABLE 11

| 3. Market Leaders Only | | | Bids vs. Market Lead | | |
|---|---|---|---|---|---|
| Bidder | Bid Time | Bid | $ | % | Rank |
| Bidder A | 1:02:45 PM | $670,000 | $112,300 | 20.14% | |
| Bidder B | 1:01:23 PM | $664,000 | $106,300 | 19.06% | |
| Bidder C | 1:01:28 PM | $560,000 | $2,300 | 0.41% | 5 |
| Bidder B | 1:03:10 PM | $559,000 | $1,300 | 0.23% | 4 |
| Bidder D | 1:02:50 PM | $558,500 | $800 | 0.14% | 3 |
| Bidder A | 1:03:38 PM | $558,300 | $600 | 0.11% | 2 |
| Bidder E | 1:05:12 PM | $557,700 | $— | 0.00% | 1 |

At 1:05:12 PM, Bidder E is in a position to continue to view all bids placed by all bidders 30 unless and until the current best bid of Bidder E falls into fourth or worse place. Bidder E, therefore, sees the market feedback illustrated in Table 12 at 1:06:49 PM.

TABLE 12

| 3. Market Leaders Only | | | Bids vs. Market Lead | | |
|---|---|---|---|---|---|
| Bidder | Bid Time | Bid | $ | % | Rank |
| Bidder A | 1:02:45 PM | $670,000 | $118,000 | 21.38% | |
| Bidder B | 1:01:23 PM | $664,000 | $112,000 | 20.29% | |
| Bidder C | 1:01:28 PM | $560,000 | $8,000 | 1.45% | |
| Bidder B | 1:03:10 PM | $559,000 | $7,000 | 1.27% | 6 |
| Bidder D | 1:02:50 PM | $558,500 | $6,500 | 1.18% | 5 |
| Bidder A | 1:03:38 PM | $558,300 | $6,300 | 1.14% | 4 |
| Bidder E | 1:05:12 PM | $557,700 | $5,700 | 1.03% | 3 |
| Bidder F | 1:05:43 PM | $557,500 | $5,500 | 1.00% | 2 |
| Bidder C | 1:06:49 PM | $552,000 | | 0.00% | 1 |

At 1:06:49 PM, Bidders C and F have submitted bids below that of Bidder E. Bidder E has not responded with any additional bids and so now ranks third, $5,700 behind the current low bid placed by Bidder C. Because Bidder E still ranks in the top three bidders 30, Bidder E is able to continue to view all current market feedback.

However, at 1:06:55 PM when Bidder G submits a new market-leading bid of $549,000. Bidder E's current best bid is ranked behind three other participants: Bidder G at $549,000, Bidder C at $552,000, and Bidder F at $557,500. That places Bidder E in fourth place overall and puts Bidder E outside of the market leaders as defined for this particular auction 56. Bidder E, therefore, receives one final update of bid history alerting Bidder E to the fact that no further feedback will be made available to Bidder E until Bidder E submits a bid low enough to place E within the top three bidders 30 once again. The market feedback provided to Bidder E after the 1:06:55 PM bid by Bidder G is shown in Table 13.

TABLE 13

| 3. Market Leaders Only Bidder | Bid Time | Bid |
|---|---|---|
| Bidder A | 1:02:45 PM | $670,000 |
| Bidder B | 1:01:23 PM | $664,000 |
| Bidder C | 1:01:28 PM | $560,000 |
| Bidder B | 1:03:10 PM | $559,000 |
| Bidder D | 1:02:50 PM | $558,500 |
| Bidder A | 1:03:38 PM | $558,300 |
| Bidder E | 1:05:12 PM | $557,700 |
| Bidder F | 1:05:43 PM | $557,500 |
| Bidder C | 1:06:49 PM | $552,000 |
| No further bid history is available until a bid ranked within the top 3 has been submitted. | | |

After 1:06:49 PM when Bidder E fell to the fourth highest bidder 30, Bidder E will no longer receive market feedback unless Bidder E places a new lower bid that raises Bidder E to at least the rank of fourth. It is noteworthy that compared to the market leader format of the previous example, which was based on a 2% differential, Bidder E lost access to market feedback earlier in the Example 3 of sequence of bidding activity because of the difference in definition of a market leader.

Example 4

The next example illustrates how the same auction 56 is viewed by Bidder E when the market leader format is used such that bidders 30 must be within $10,000 of the current low bid to view bidding activity. Again, at 1:04:00 PM, Bidder E does not receive any market feedback because Bidder E has not placed a bid, as shown in Table 14.

TABLE 14

| 4. Market Leaders Only | | | Bid vs. Market Lead | | |
|---|---|---|---|---|---|
| Bidder | Bid Time | Bid | $ | % | Rank |
| No bid history is available until a bid has been submitted. | | | | | |

At 1:05:12 PM, Bidder E places a bid of $557,700, which is a new market-leading bid. That entitles Bidder E to view all bid history up until that point. Bidder E would, therefore, see the bid history shown in Table 15.

TABLE 15

| 4. Market Leaders Only | | | Bids vs. Market Lead | | |
|---|---|---|---|---|---|
| Bidder | Bid Time | Bid | $ | % | Rank |
| Bidder A | 1:02:45 PM | $670,000 | $112,300 | 20.14% | |
| Bidder B | 1:01:23 PM | $664,000 | $106,300 | 19.06% | |
| Bidder C | 1:01:28 PM | $560,000 | $2,300 | 0.41% | 5 |

TABLE 15-continued

| 4. Market Leaders Only | | | Bids vs. Market Lead | | |
|---|---|---|---|---|---|
| Bidder | Bid Time | Bid | $ | % | Rank |
| Bidder B | 1:03:10 PM | $559,000 | $1,300 | 0.23% | 4 |
| Bidder D | 1:02:50 PM | $558,500 | $800 | 0.14% | 3 |
| Bidder A | 1:03:38 PM | $558,300 | $600 | 0.11% | 2 |
| Bidder E | 1:05:12 PM | $557,700 | $— | 0.00% | 1 |

Once Bidder E has placed a bid that is within $10,000 of the lowest bid, such as the market leading bid of $557,000 placed at 1:05:12 PM, Bidder E will receive market feedback related to all bids placed by all bidders 30 unless and until the current best bid of Bidder E falls more than $10,000 behind the market-leading bid. Thus, the market feedback provided to Bidder E at 1:06:55 PM is shown in Table 16.

TABLE 16

| 4. Market Leaders Only | | | Bids vs. Market Lead | | |
|---|---|---|---|---|---|
| Bidder | Bid Time | Bid | $ | % | Rank |
| Bidder A | 1:02:45 PM | $670,000 | $121,000 | 22.04% | |
| Bidder B | 1:01:23 PM | $664,000 | $115,000 | 20.95% | |
| Bidder C | 1:01:28 PM | $560,000 | $11,000 | 2.00% | |
| Bidder B | 1:03:10 PM | $559,000 | $10,000 | 1.82% | 7 |
| Bidder D | 1:02:50 PM | $558,500 | $9,500 | 1.73% | 6 |
| Bidder A | 1:03:38 PM | $558,300 | $9,300 | 1.69% | 5 |
| Bidder E | 1:05:12 PM | $557,700 | $8,700 | 1.58% | 4 |
| Bidder F | 1:05:43 PM | $557,500 | $8,500 | 1.55% | 3 |
| Bidder C | 1:06:49 PM | $552,000 | $3,000 | 0.55% | 2 |
| Bidder G | 1:06:55 PM | $549,000 | $— | 0.00% | 1 |

At 1:06:55 PM Bidders C, F, and G have all bid below the original bid placed by Bidder E. Bidder E has not responded with any additional bids and so now ranks in fourth place, 1.58% behind the current low bid placed by Bidder G. There is, however, only a differential of $8,700 between Bidder E's current best bid of $557,700 and the market-leading bid of $549,000 submitted by Bidder G.

At 1:07:22 PM, Bidder C places a new market-leading bid of $546,800 into the auction 56. At that point in time, the current best bid of Bidder E is $10,900 or 1.99% behind the market-leading bid. $10,900 is more than the $10,000 differential required to stay within the market-leading group of bidders 30. Accordingly, Bidder E receives one final update of bid history alerting Bidder E to the fact that no further feedback will be made available until Bidder E submits a lower bid that is within $10,000 of the current low bid, as is shown in Table 17.

TABLE 17

| 4. Market Leaders Only Bidder | Bid Time | Bid |
|---|---|---|
| Bidder A | 1:02:45 PM | $670,000 |
| Bidder B | 1:01:23 PM | $664,000 |
| Bidder C | 1:01:28 PM | $560,000 |
| Bidder B | 1:03:10 PM | $559,000 |
| Bidder D | 1:02:50 PM | $558,500 |
| Bidder A | 1:03:38 PM | $558,300 |
| Bidder E | 1:05:12 PM | $557,700 |
| Bidder F | 1:05:43 PM | $557,500 |
| Bidder C | 1:06:49 PM | $552,000 |
| Bidder G | 1:06:55 PM | $549,000 |
| No further bid history is available until a bid ranked within $10,000 of the market leading bid has been submitted. | | |

As with the previously discussed market leader format examples, Bidder E no longer receives market feedback after the lowest bid of Bidder E falls out of the required market-leading range. Note that compared to the market leader format based on the 2% differential or the top three ranking, Bidder E drops out at a different stage in the sequence of bidding activity when the dollar differential method is utilized.

After falling from the market lead based on the dollar differential between the best current bid of Bidder E and the market leading bid, Bidder E may only view more bid history if Bidder E places a new bid low enough to put Bidder E within $10,000 of the market leading bid. In the case illustrated in this example, while the bidding activity continued until 1:08:44 PM, Bidder E did not re-bid at any time and so Bidder E did not receive any further feedback about the market-leading bidding activity in the auction 56.

Example 5

Market feedback may also be provided in combination such as, for example, providing a bidder 30 with the current rank of that bidder 30 and the next lowest bid. Such a format will be referred to herein as a "next horse" format. By using the next horse format, each bidder 30 may be given information regarding where it stands in the overall bidding and how much its bid must be modified to move up one place in the ranking. The bidder 30 may thus gain more information each time it places a bid that is below that of the next ranked bidder 30. The bidder 30 is therefore encouraged to place additional bids and actively participate in the auction 56, but is not provided with information regarding the lowest bids unless that bidder 30 places a bid that is competitive with the those lowest bids. In that way, not only are bidders 30 encouraged to participate actively in the auction 56, but low bid information is also withheld from those bidders 30 who are not willing to participate actively and competitively in the auction 56.

Thus, in the embodiment considered in this example, the only feedback a particular subject bidder 30 will receive throughout the entire auction 56 is the rank of the current bidder 30 and the value of the bid that is one better than the best bid submitted by the bidder 30. Also in this example, each bidder 30 must submit at least one bid before that bidder 30 will receive any market feedback.

Figure 10A:
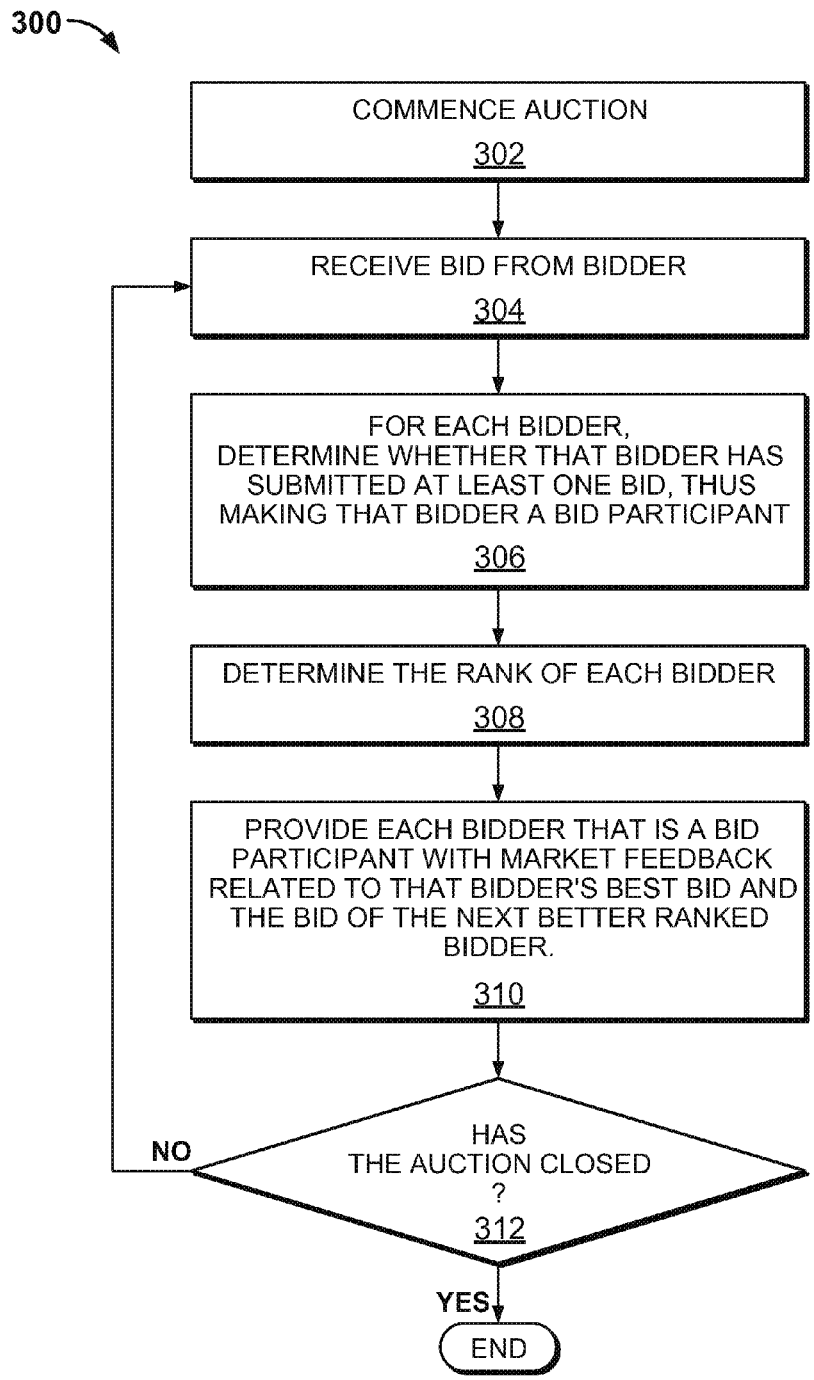
FIG. 10A is a flow diagram illustrating yet another information flow of the present is invention.

FIG. 10A is a flow diagram 300 illustrating an embodiment of the present invention utilizing the next horse format in combination with the requirement that at least one bid must be placed before any information is divulged to a bidder 30. The example provided assumes that a computer processor, is executing a set of instructions that perform the steps, however, it will be recognized by one skilled in the art that the instructions may be carried out by any known method. At 302, the auction 56 is commenced and bids are accepted from the bidders 30. The auction 56 normally begins at a scheduled time that is prearranged between the auction coordinator 20, the purchaser 10 and the bidders 30. At 304, a bid is received from a bidder 30. That bid may be a bid that is created by a bidder 30 and submitted to the data processing network 77 from the client machine 72 by way of the communications network 73. At 306, a determination is made as to whether each bidder 30 has qualified as a bid participant by submitting at least one qualified bid. At 308, the rank of each bidder 30 is determined. At 310, each bidder 30 that is a bid participant is provided with the appropriate market feedback which, in this example, includes information related to the best bid submitted by the subject bidder and information related to the bidder ranked one above the current bidder. After providing the appropriate market feedback to each bidder 30, the processor will determine whether the auction closing time has arrived at 312. If the auction closing time has not arrived, the processor will return to 304 to receive additional bids. If the auction closing time has arrived, the auction 56 will close and no additional bids will be accepted.

FIGS. 11-16 illustrate sample screens that are displayed for various participants in a particular auction 56 utilizing the next horse format described in connection with FIG. 10A. Each of screens 11-16 were captured during the same auction 56 after the bids depicted on FIG. 11 were submitted and before any other bids were submitted. Thus, screens 11-16 illustrate the market feedback that is provided to various participants in a single next horse format auction 56 is during a common time period. FIG. 11 illustrates a sample of a screen 350 that is displayed to the purchaser 10. At 352, a lot listing is provided that contains statistics for three lots of transportation services that are being auctioned. The first lot is highlighted and is, therefore, active in other portions of the screen 350. At 354, statistics for all three lots are displayed and at 356, additional statistics for lot one are displayed. A bid history 358, containing a listing of bids received for lot one is also displayed.

FIG. 12 illustrates a sample of a screen 360 that is displayed to a bidder 30 who has not submitted a valid bid for lot one during the course of the auction 56. A lot listing 362 is provided to display market feedback related to the next lowest bid. No statistics relating to other bidders 30 are displayed for any of the three lots, indicating that a valid bid has not been placed by the viewing bidder 30. Fields for Next Place Bid 363 and My vs. Next 365 are provided in the lot listing 362. Those fields are necessarily different than the fields provided to the purchaser 10 in FIG. 11 or a bidder 30 in the auction 56 illustrated in FIGS. 6-8, because it is important that the purchaser 10 be aware of all bids including the market leading bid and because it has been determined that bidders 30 in the example illustrated in FIGS. 11-16 are to be provided less market feedback than bidders 30 in the example illustrated in FIGS. 6-8. Also, unlike the lot listing 162 of the screen 160 illustrated in FIG. 7, the lot listing 362 of FIG. 12 does not include a "Best Offering" field. The "Best Offering" field, which appears in FIGS. 7 and 8, may not be utilized in the embodiment illustrated in FIGS. 11-16 because, for example, that embodiment does not provide for bidding of different options related to each lot. Best offering is furthermore an option that may be utilized or not utilized in any of the embodiments discussed herein.

A bid area 364 is provided from which a bid may be submitted. Within that bid area 364 are a number of buttons, including a disabled take next button 367 which will be discussed further hereinafter. Other buttons for submitting a bid and reloading the last bid submitted are also provided in the bid area 364. At 366, the bidder 30 is provided with a general status area and at 368, a status area for the active lot is provided. Within the active lot status area 368, the rank of the viewing bidder is not displayed in the "My Rank" field 370 because the viewing bidder has not yet submitted a valid bid for lot one. Unlike the active lot status area 168 of FIG. 7, the active lot status area 368 of FIG. 12 does not include a total bid field. That is because the total number of bids is not a piece of market feedback that is provided in the embodiment of the next horse format of this example. A bid history area 372 provides relevant bid history to the viewing bidder 30 if that viewing bidder 30 has placed a valid bid for the active lot. The viewing bidder 30 of screen 360, however, has not placed a valid bid for the active lot and, therefore, a message stating "bid history is not available until you submit a valid bid in this lot" is displayed in the bid history area 372.

FIG. 13 illustrates a sample screen 380 that is displayed to a bidder 30 who has submitted at least one valid bid for lot one and is ranked fourth in the bidding. A lot listing 382 is provided that includes values in the "Next Place Bid" field 363 and the "My vs. Next" field 365 for lot one. Lot one is furthermore active in the remainder of the screen 380 because lot one is the highlighted lot in the lot listing 382. Fields 363 and 365 are displayed because the bidder 30 viewing the screen 380 of FIG. 13 has submitted at least one valid bid for lot one. At 384, the bid area is displayed and the take next button 367 is enabled as indicated by the dark lettering in the take next button 367. At 386, a general status area is provided for all lots currently being auctioned. An active lot status area 388 is provided and includes market feedback regarding the rank of the viewing bidder 30 with regard to lot one because that bidder 30 has placed a valid bid for lot one, which is the active lot. A historic bid listing, applicable to the viewer of screen 380, is provided in the bid history area 390. That bid history includes market feedback for the lowest price bid by the viewing bidder 30 and all higher bids. In keeping with the next horse format, the bid history area 390 could provide varying data. For example, market feedback related to the next better ranked bidder 30 could be provided in the bid history area 390 since market feedback related to that bidder 30 is already provided in the lot listing 382. Alternately, market feedback related to previously submitted higher bids may or may not be provided in the bid history area 390 when using the next horse format or any other format discussed herein.

Figure 14:
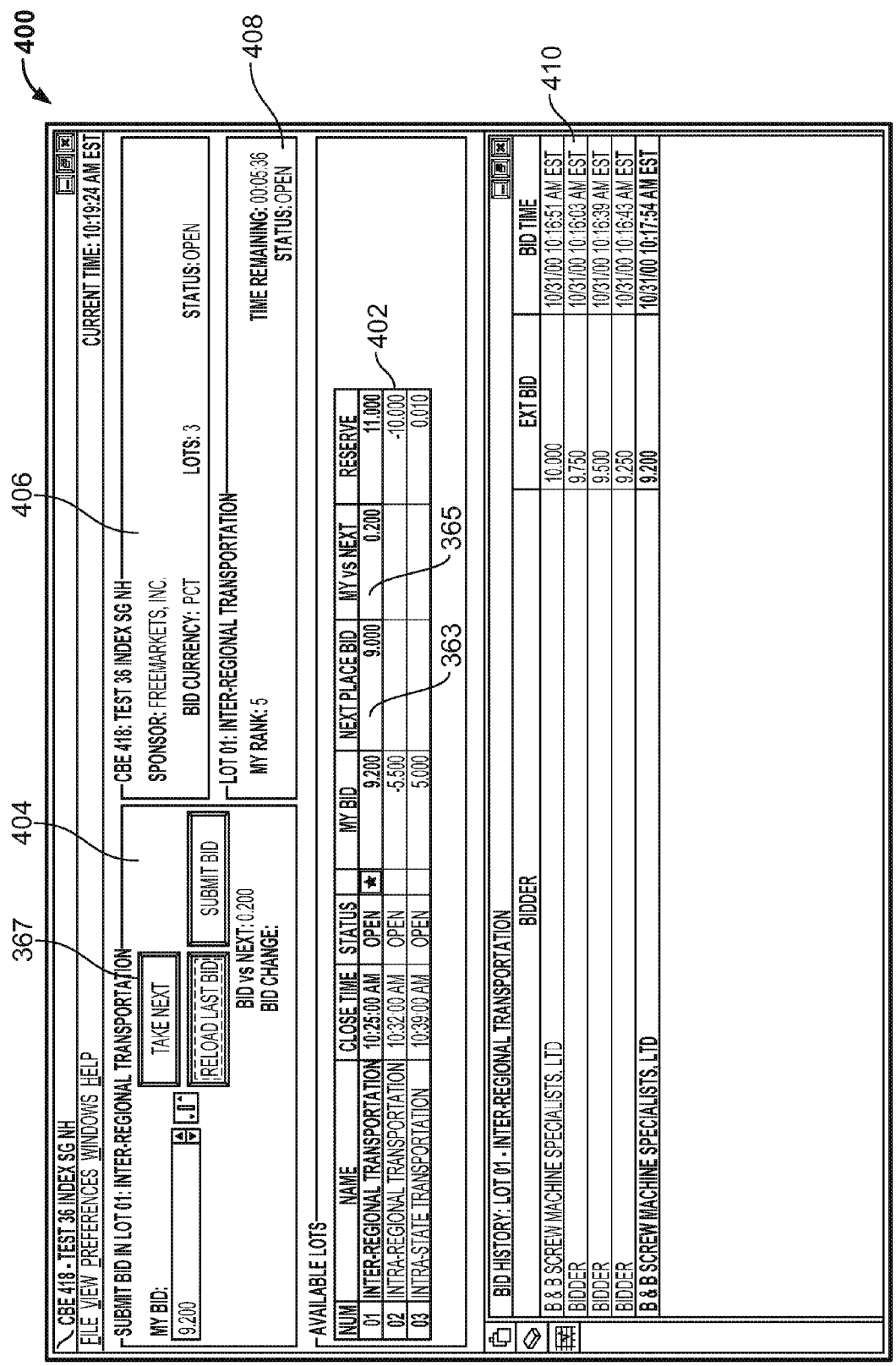
FIG. 14 is another sample bidder screen display that may be used to practice the embodiment of the invention of FIG. 11.

FIG. 14 illustrates a sample screen 400 that is displayed to a bidder 30 who has submitted at least one valid bid for lot one and is ranked fifth in the bidding. A lot listing 402 is provided that includes values in the "Next Place Bid" field 363 and the "My vs. Next" field 365 for lot one. Lot one is furthermore active in the remainder of the screen 400 because lot one is the highlighted lot in the lot listing 402. Fields 363 and 365 are displayed because the bidder 30 viewing the screen 400 of FIG. 14 has submitted at least one valid bid for lot one. A bid area 404 is displayed and the take next button 367 is enabled as indicated by the dark lettering in the take next button 367. At 406, a general status area is provided for all lots currently being auctioned. At 408, an active lot status area is provided which includes market feedback regarding the rank of the viewing bidder with regard to lot one 30 because that bidder 30 has placed a bid for active lot one. A listing of historic bids that is applicable to the viewer of screen 400 is provided in the bid history area 410. That bid history includes market feedback for the lowest price bid by the viewing bidder 30 and all higher bids. Thus, the bid history area 410 of FIG. 14 does not include the bid by the fourth ranked bidder that is shown in the bid history area 390 of FIG. 13 because the viewer of screen 400 has a worse ranking than the viewer of screen 380.

FIG. 15 illustrates a sample screen 420 that is displayed to a bidder 30 who has submitted at least one valid bid for lot one and is ranked second in the bidding. A lot listing 422 is provided that includes values in the "Next Place Bid" field 363 and the "My vs. Next" field 365 for lot one. Lot one is furthermore active in the remainder of the screen 420 because lot one is the highlighted lot in the lot listing 422. Fields 363 and 365 are displayed because the bidder 30 viewing the screen 420 of FIG. 15 has submitted at least one valid bid for lot one. A bid area 404 is displayed and includes an enabled take next button 367, as indicated by the dark lettering in the take next button 367. A general status area 426 is provided for all lots currently being auctioned and an active lot status area 428 is provided which includes market feedback regarding the rain of the viewing bidder 30 with regard to lot one because that bidder 30 has placed a bid for active lot one. A bid history applicable to the viewer of screen 420 is provided in the bid history area 430. That bid history, like that of the other bidders 30 who have submitted a valid bid in the active lot, includes market feedback for the lowest price bid by the viewing bidder 30 and all higher bids. Thus, the bid history area 430 of FIG. 15 includes all bids by the second and worse ranked bidders 30 and the lot listing 422 provides market information for the first place bidder.

Figure 16:
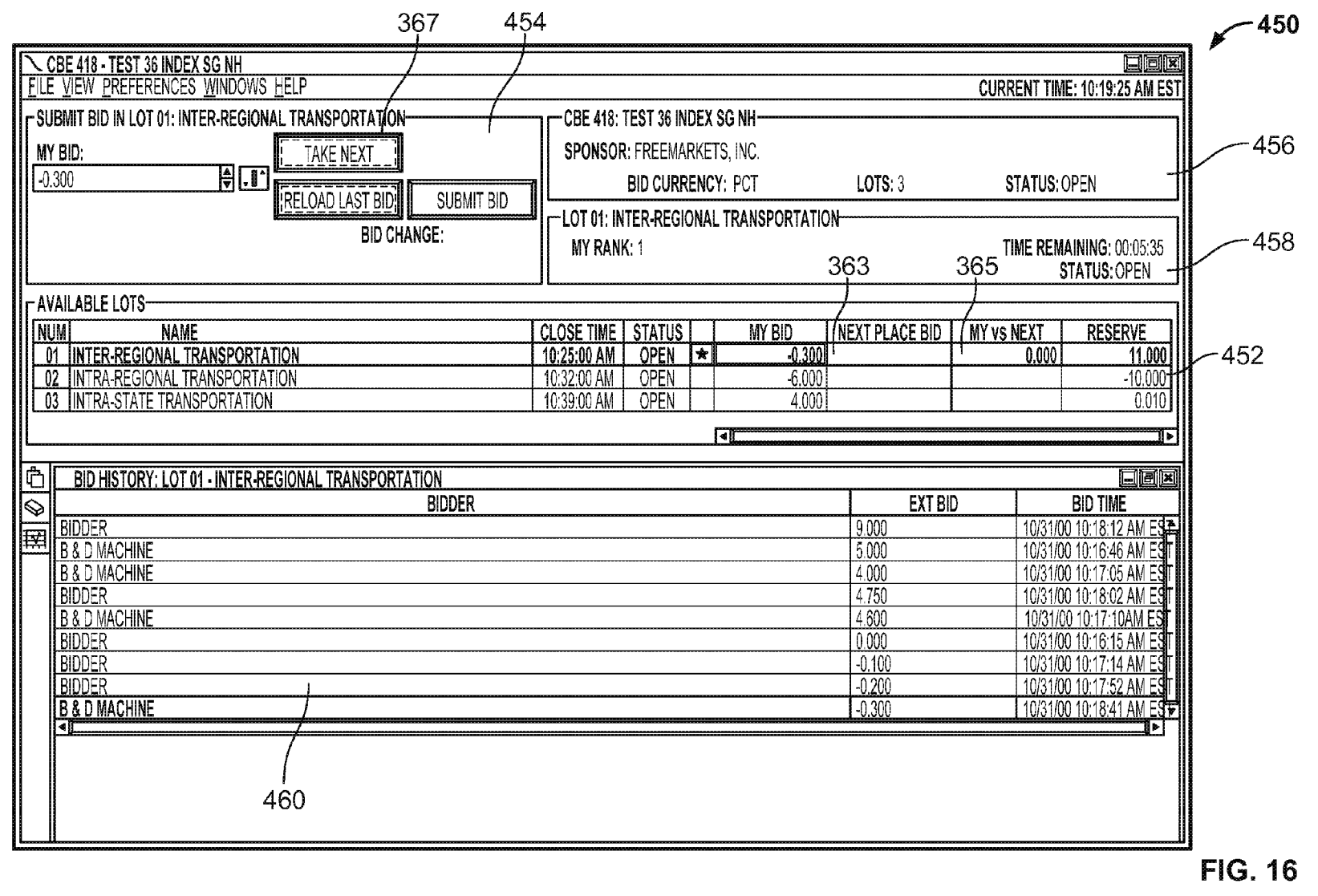

FIG. 16 illustrates a sample screen 450 that is displayed to a bidder 30 who has submitted at least one valid bid for lot one and is ranked first in the bidding. A lot listing 452 is provided that includes values in the "Next Place Bid" field 363 and the "My vs. Next" field 365 for lot one. Lot one is furthermore active in the remainder of the screen 450 because lot one is the highlighted lot in the lot listing 452. Fields 363 and 365 are displayed because the bidder 30 viewing the screen 450 of FIG. 16 has submitted at least one valid bid for lot one. A bid area 454 is displayed and the take next button 367 is enabled as indicated by the dark lettering in the take next button 367. At 456, a general status area is provided for all lots currently being auctioned. At 458, an active lot status area is provided which includes market feedback regarding the rank of the viewing bidder 30 because that bidder 30 has placed a valid bid for active lot one. A bid history applicable to the viewer of screen 450 is provided in the bid history area 460. That bid history, like that of the other bidders 30 who have submitted a valid bid, includes market feedback for the lowest amount bid by the viewing bidder 30 and all higher bids. Thus, the bid history area 460 of FIG. 16 includes all bids submitted by all bidders 30.

Another example of market feedback that may be provided to a bidder 30 using a next horse format is as follows: after placing its first bid, a bidder 30 in third place will be informed of (i) the value of its current best bid; (ii) the fact that it is ranked third in the auction 56; and (iii) the value of the bid placed by the second ranked bidder 30. Similarly, the bidder 30 in second place will know (i) the value of its current best bid; (ii) the fact that it is ranked second in the auction 56; and (iii) the value of the bid placed by the first ranked bidder 30.

The only way for a bidder 30 to receive market feedback concerning more competitive bids is to place a bid that improves their competitive position in the auction 56. Consider, for example, a situation, wherein Bidder A is ranked fourth and Bidder B is ranked third. If Bidder A places a bid that is lower than the that of Bidder B, Bidder A becomes the third ranked bidder 30 and Bidder B becomes the fourth ranked bidder. Bidder A is then permitted to view the new third place bid that Bidder A just submitted, as well as the second placed bid. That format precludes all but the most aggressive bidders 30 from visibility to true market pricing. In fact, the only participants that will know the value of the first placed bid will be the first and second placed bidders 30.

The next horse format may be a particularly risky format for an incumbent bidder 30. Without any real knowledge of how far from the bottom of the market they need to be, an incumbent is taking a substantial risk by not being in the top 1 or 2 bidders 30.

Example 6

Consider again the sequence of bidding activity in Table 1, assuming this time that the auction 56 was set up to use a next horse format that provides only information regarding the best bid of that bidder 30 and the next better ranked bidder 30 and does not provide a listing of worse bids that have been placed. At 1:04:00 PM, Bidder E would not receive any market feedback because Bidder E has not yet placed any bids. Thus, Bidder E is provided with no market feedback at 1:04:00 PM as is shown in Table 18.

TABLE 18

| 5. Next Horse | | | Bid vs. Market Lead | | |
|---|---|---|---|---|---|
| Bidder | Bid Time | Bid | $ | % | Rank |
| No bid history is available until a bid has been submitted. | | | | | |

At 1:07:49 PM, Bidder E has placed a bid and is in fourth place behind bidders F, C and G. The full bid history (not visible to any of the bidders 30 in this example) is repeated in Table 19.

TABLE 19

| 5a. Next Horse (1:07:49) | | | Bids vs. Market Lead | | |
|---|---|---|---|---|---|
| Bidder | Bid Time | Bid | $ | % | Rank |
| Bidder A | 1:02:45 PM | $670,000 | $123,600 | 22.62% | |
| Bidder B | 1:01:23 PM | $664,000 | $117,600 | 21.52% | |
| Bidder C | 1:01:28 PM | $560,000 | $13,600 | 2.49 | |
| Bidder B | 1:03:10 PM | $559,000 | $12,600 | 2.31 | 7 |
| Bidder D | 1:02:50 PM | $558,500 | $12,100 | 2.21 | 6 |
| Bidder A | 1:03:38 PM | $558,300 | $11,900 | 2.18 | 5 |
| Bidder E | 1:05:12 PM | $557,700 | $11,3000 | 2.07 | 4 |
| Bidder F | 1:05:43 PM | $557,500 | $11,100 | 2.03 | |
| Bidder C | 1:06:49 PM | $552,000 | $5,600 | 1.02 | |
| Bidder G | 1:06:55 PM | $549,000 | $2,600 | 0.48 | 3 |
| Bidder C | 1:07:22 PM | $546,800 | $400 | 0.07 | 2 |
| Bidder F | 1:07:49 PM | $546,400 | $— | 0.00 | 1 |

In the next horse format of this example at 1:07:49 PM, Bidder E is informed that it is currently in fourth place, and that the third placed bidder 30 has placed a bid of $549,000, which is $8,700 or 1.58% lower than E's current best bid of $557,700 as is shown in Table 20.

TABLE 20

| 5a. Next Horse (Bidder E) | | | Bid vs. Next Horse | | |
|---|---|---|---|---|---|
| Bidder | Bid Time | Bid | $ | % | Rank |
| Bidder E | 1:05:12 PM | $557,700 | $8,700 | 1.58% | 4 |
| Bidder G | 1:06:55 PM | $549,000 | | | 3 |

At 1:07:49 PM, Bidder G is informed that it is currently in third place, and that the second ranked bidder has placed a bid of $546,800, which is $2,200 or 0.40% lower than Bidder G's current best bid of $549,000 as is shown in Table 21.

TABLE 21

| 5a. Next Horse (Bidder G) | | | Bid vs. Next Horse | | |
|---|---|---|---|---|---|
| Bidder | Bid Time | Bid | $ | % | Rank |
| Bidder G | 1:06:55 PM | $549,000 | $2,200 | 0.40% | 3 |
| Bidder C | 1:07:22 PM | $546,800 | | | 2 |

At 1:07:49 PM, Bidder C is informed that it is currently in second place, and that the first placed bidder 30 has placed a bid of $546,400, which is $400 or 0.07% lower than Bidder C's current best bid of $546,800, as is shown in Table 22.

TABLE 22

| 5a. Next Horse (Bidder G) | | | Bid vs. Next Horse | | |
|---|---|---|---|---|---|
| Bidder | Bid Time | Bid | $ | % | Rank |
| Bidder C | 1:07:22 PM | $546,800 | $400 | 0.07% | 2 |
| Bidder F | 1:07:49 PM | $546,400 | | | 1 |

At 1:07:49 PM, Bidder F is informed that it is currently in first place with a bid of $546,400, as is shown in Table 23.

TABLE 23

| 5a. Next Horse (Bidder G) | | | Bid vs. Next Horse | | |
|---|---|---|---|---|---|
| Bidder | Bid Time | Bid | $ | % | Rank |
| Bidder F | 1:07:49 PM | $546,400 | $— | 0.00% | 1 |

At 1:08:02 PM, Bidder C places a new market leading bid moving Bidder C up in rank from second to first place. The full bid history (not visible to any of the bidders 30 in this example) is shown in Table 24.

TABLE 24

| 5b. Next Horse (2:08:02) | | | Bid vs. Next Horse | | |
|---|---|---|---|---|---|
| Bidder | Bid Time | Bid | $ | % | Rank |
| Bidder A | 1:02:45 PM | $670,000 | $123,750 | 22.65% | |
| Bidder B | 1:01:23 PM | $664,000 | $117,750 | 21.56% | |
| Bidder C | 1:01:28 PM | $560,000 | $13,750 | 2.52% | |
| Bidder B | 1:03:10 PM | $559,000 | $12,750 | 2.33% | 7 |
| Bidder D | 1:02:50 PM | $558,500 | $12,250 | 2.24% | 6 |
| Bidder A | 1:03:38 PM | $558,300 | $12,050 | 2.21% | 5 |
| Bidder E | 1:05:12 PM | $557,700 | $11,450 | 2.10% | 4 |
| Bidder F | 1:05:43 PM | $557,500 | $11,250 | 2.06% | |
| Bidder C | 1:06:49 PM | $552,000 | $5,750 | 1.05% | |
| Bidder G | 1:06:55 PM | $549,000 | $2,750 | 0.50% | 3 |
| Bidder C | 1:07:22 PM | $546,800 | $550 | 0.10% | |
| Bidder F | 1:07:49 PM | $546,400 | $150 | 0.03% | 2 |
| Bidder C | 1:08:02 PM | $546,250 | $— | 0.00% | 1 |

Bidder C will, therefore, see that it is ranked first at 1:08:02 PM with a bid of $546,250, as is shown in Table 25.

TABLE 25

| 5b. Next Horse (Bidder C) | | | Bid vs. Next Horse | | |
|---|---|---|---|---|---|
| Bidder | Bid Time | Bid | $ | % | Rank |
| Bidder C | 1:08:02 PM | $546,250 | $— | 0.00% | 1 |

Bidder F, who has been displaced from first place at 1:08:02 PM, will see that it is in second place at 1:08:02 PM, and that the bidder ranked first has placed a bid of $546,250, which is $150 or 0.03% lower than the best bid of $546,400 placed by Bidder F, as is shown in Table 26.

TABLE 26

| 5b. Next Horse (Bidder F) | | | Bid vs. Next Horse | | |
|---|---|---|---|---|---|
| Bidder | Bid Time | Bid | $ | % | Rank |
| Bidder F | 1:07:49 PM | $546,400 | $150 | 0.03% | 2 |
| Bidder C | 1:08:02 PM | $546,250 | | | 1 |

At 1:08:02 PM, Bidder G remains in third place but can see that the second placed bidder is now at $546,400, which is $2,600 or 0.48% lower than G's best bid of $549,000. Bidder G thus learns that activity between the first and second placed bidders has increased the distance between Bidder G and the market-leading bid, as is shown in Table 27.

TABLE 27

| 5b. Next Horse (Bidder G) | | | Bid vs. Next Horse | | |
|---|---|---|---|---|---|
| Bidder | Bid Time | Bid | $ | % | Rank |
| Bidder G | 1:06:55 PM | $549,000 | $2,600 | 0.48% | 3 |
| Bidder F | 1:07:49 PM | $546,400 | | | 2 |

Next, consider the situation at 1:08:17 PM. Bidder B (previously in seventh place) places a new market-leading bid of $545,000. Bidder B is now ranked first. The full bid history up until 1:08:17 PM (not visible to any of the bidders 30 in this example) is shown in Table 28.

TABLE 28

| 5c. Next Horse (1:08:17) | | | Bid vs. Next Horse | | |
|---|---|---|---|---|---|
| Bidder | Bid Time | Bid | $ | % | Rank |
| Bidder A | 1:02:45 PM | $670,000 | $125,000 | 22.94% | |
| Bidder B | 1:01:23 PM | $664,000 | $119,000 | 21.83% | |
| Bidder C | 1:01:28 PM | $560,000 | $15,000 | 2.75% | |
| Bidder B | 1:03:10 PM | $559,000 | $14,000 | 2.57% | |
| Bidder D | 1:02:50 PM | $558,500 | $13,500 | 2.48% | 7 |
| Bidder A | 1:03:38 PM | $558,300 | $13,300 | 2.44% | 6 |
| Bidder E | 1:05:12 PM | $557,700 | $12,700 | 2.33% | 5 |
| Bidder F | 1:05:43 PM | $557,500 | $12,500 | 2.29% | |
| Bidder C | 1:06:49 PM | $552,000 | $7,000 | 1.28% | |
| Bidder G | 1:06:55 PM | $549,000 | $4,000 | 0.73% | 4 |
| Bidder C | 1:07:22 PM | $546,800 | $1,800 | 0.33% | |
| Bidder F | 1:07:49 PM | $546,400 | $1,400 | 0.26% | 3 |
| Bidder C | 1:08:02 PM | $546,250 | $1,250 | 0.23% | 2 |
| Bidder B | 1:08:17 PM | $545,000 | $ — | 0.00% | 1 |

At 1:08:17 PM, Bidder C, who has been displaced from first place, will see that it are now in second place, and that the first placed bidder has placed a bid of $545,000, which is $1,250 or 0.23% lower than C's best bid of $546,250, as is shown in Table 29.

TABLE 29

| 5C. Next Horse (Bidder C) | | | Bid vs. Next Horse | | |
|---|---|---|---|---|---|
| Bidder | Bid Time | Bid | $ | % | Rank |
| Bidder C | 1:08:02 PM | $546,250 | $1,250 | 0.23% | 2 |
| Bidder B | 1:08:17 PM | $545,000 | | | 1 |

Bidder F has been displaced from second place and now ranks third. Although the ranking has changed, in all other respects F sees the same feedback. The second placed bidder 30 is at $546,250, which is $150 or 0.03% lower than Bidder F's best bid of $546,400, as is shown in Table 30.

TABLE 30

| 5c. Next Horse (Bidder F) | | | Bid vs. Next Horse | | |
|---|---|---|---|---|---|
| Bidder | Bid Time | Bid | $ | % | Rank |
| Bidder F | 1:07:49 PM | $546,400 | $150 | 0.03% | 3 |
| Bidder C | 1:08:02 PM | $546,250 | | | 2 |

At 1:08:17 PM, Bidder G faces a situation similar to that of Bidder F. Bidder G has been displaced from third place and now ranks fourth overall, but the feedback with respect to the next placed bidder is the same. The third placed bidder is at $546,400, which is $2,600 or 0.48% lower than G's best bid of $549,000, as is shown in Table 31.

TABLE 31

| 5c. Next Horse (Bidder G; 1:08:17) | | | Bid vs. Next Horse | | |
|---|---|---|---|---|---|
| Bidder | Bid Time | Bid | $ | % | Rank |
| Bidder G | 1:06:55 PM | $549,000 | $2,600 | 0.48% | 4 |
| Bidder F | 1:07:49 PM | $546,400 | | | 3 |

At 1:08:44 PM, Bidder G decides to lower its bid by $7,000. That places Bidder G in first place. The full bid history (not visible to any of the bidders 30 in this example) is shown in Table 32.

TABLE 32

| 5d. Next Horse (1:08:44) | | | Bid vs. Next Horse | | |
|---|---|---|---|---|---|
| Bidder | Bid Time | Bid | $ | % | Rank |
| Bidder A | 1:02:45 PM | $670,000 | $128,000 | 23.62% | |
| Bidder B | 1:01:23 PM | $664,000 | $122,000 | 22.51% | |
| Bidder C | 1:01:28 PM | $560,000 | $18,000 | 3.32% | |
| Bidder B | 1:03:10 PM | $559,000 | $17,000 | 3.14% | |
| Bidder D | 1:02:50 PM | $558,500 | $16,500 | 3.04% | 7 |
| Bidder A | 1:03:38 PM | $558,300 | $16,300 | 3.01% | 6 |
| Bidder E | 1:05:12 PM | $557,700 | $15,700 | 2.90% | 5 |
| Bidder F | 1:05:43 PM | $557,500 | $15,500 | 2.86% | |
| Bidder C | 1:06:49 PM | $552,000 | $10,000 | 1.85% | |
| Bidder G | 1:06:55 PM | $549,000 | $7,000 | 1.29% | |
| Bidder C | 1:07:22 PM | $546,800 | $4,800 | 0.89% | |
| Bidder F | 1:07:49 PM | $546,400 | $4,400 | 0.81% | 4 |
| Bidder C | 1:08:02 PM | $546,250 | $4,250 | 0.78% | 3 |
| Bidder B | 1:08:17 PM | $545,000 | $3,000 | 0.55% | 2 |
| Bidder G | 1:08:44 PM | $542,000 | $ — | 0.00% | 1 |

At 1:08:44 PM, Bidder G is provided with the market feedback shown in Table 33.

TABLE 33

| 5d. Next Horse (Bidder G; 1:08:44) | | | Bid vs. Next Horse | | |
|---|---|---|---|---|---|
| Bidder | Bid Time | Bid | $ | % | Rank |
| Bidder G | 1:08:44 PM | $542,000 | $ — | 0.00% | 1 |

Thus, at 1:08:44 PM Bidder B has been displaced from first place. Bidder B will, therefore, see that it is now ranked second and that the first placed bidder has placed a bid of $542,000, which is $3,000 or 0.55% lower than B's bid of $545,000. The market feedback provided to Bidder B at 1:08:44 PM is illustrated in Table 34.

TABLE 34

| 5d. Next Horse (Bidder B; 1:08:44) | | | Bid vs. Next Horse | | |
|---|---|---|---|---|---|
| Bidder | Bid Time | Bid | $ | % | Rank |
| Bidder B | 1:08:17 PM | $545,000 | $3,000 | 0.55% | 2 |
| Bidder G | 1:08:44 PM | $542,000 | | | 1 |

At 1:08:44 PM, Bidder C sees the same feedback as before, except that the rank of Bidder C has now slipped from second to third place. Bidder C will, however, be advised that the second placed bidder is at $545,000, which is $1,250 or 0.23% lower than the lowest bid submitted by Bidder C, which is $546,250. The market feedback provided to Bidder C at 1:08:44 PM is illustrated in Table 35.

TABLE 35

| 5d. Next Horse (Bidder C; 1:08:44) | | | Bid vs. Next Horse | | |
| --- | --- | --- | --- | --- | --- |
| Bidder | Bid Time | Bid | $ | % | Rank |
| Bidder C | 1:08:02 PM | $546,250 | $1,250 | 0.23% | 3 |
| Bidder B | 1:08:17 PM | $545,000 | | | 2 |

At 1:08:44 PM, Bidder F would view the market feedback shown in Table 36 and the remaining bidders 30 would also be provided with market feedback according to the next horse format utilized in this example.

TABLE 36

| 5d. Next Horse (Bidder F; 1:08:44) | | | Bid vs. Next Horse | | |
| --- | --- | --- | --- | --- | --- |
| Bidder | Bid Time | Bid | $ | % | Rank |
| Bidder F | 1:07:49 PM | $546,400 | $150 | 0.03% | 4 |
| Bidder C | 1:08:02 PM | $546,250 | | | 3 |

Other combinations of market feedback may also be provided in connection with the next horse format. For example, as previously described, in certain embodiments of the next horse market feedback format, not only is information provided for the next better bid, information related to all worse bids is also provided.

Auctions 56, and particularly online auctions 56, can be fast paced, requiring bidders 30 to make important decisions about whether to submit an additional bid to better that of another bidder 30. In many auctions 56 bettering a bid placed by another bidder 30 may not be as simple as placing a bid that is one dollar less than that placed by the other bidder 30. For example, to avoid the submission of many bids that better each other by very small amounts, purchasers 10 may require that bidders 30 place a minimum differential bid to better that of the next higher ranked bidder 30, another higher ranked bidder 30, or the market leading bidder 30.

Thus, for example, if Bidder A has placed a best bid of $52,000 in a reverse auction 56, Bidder B has placed the next better ranked bid with a bid of $550,000, and the minimum differential bid required is $500, then Bidder A would have to submit a bid of no more than $49,500 to move up one place in the ranking Because bids are not always submitted in such round numbers and time allowed to calculate and place another bid, particularly near the closing of an auction 56, can be short, it is beneficial to include in the auction 56 a facility for calculating and/or submitting the maximum amount that would place the bidder 30 at a desired rank. The present invention, therefore, may include one or more facilities for automatically calculating the maximum amount that may be bid to place a bidder 30 at a desired rank in a reverse auction. Of course, such a minimum differential may also be applied to a forward auction and a facility that adds the minimum differential to a better ranked bid would be equally applicable.

Example 7

In a certain embodiment of the invention, wherein the next horse format is utilized such that only the amount bid by the next better bidder 30 and current ranking is known to each bidder 30, a "take next rank" facility may be provided in the auction software. That take next rank facility may take the form of a button that may be depressed or a selectable button that is displayed on the screen of the bidder 30. An example of such a button is illustrated on FIGS. 12-16 at reference number 367 and is labeled "Take Next."

Selection of the take next rank button or a similar take higher rank button (not illustrated) may perform several functions including, for example, calculating the maximum amount that must be bid to attain the next higher rank, and submitting that amount as a bid.

Selection of the take next rank button or take higher rank button may alternately only calculate the maximum amount that must be bid to attain the next higher rank. In that format, the bidder 30 may have the amount required for the next bid provided quickly and accurately and then consider whether to place a bid equal to the calculated amount, place a bid for a lesser amount, or choose not to place a bid that moves that bidder 30 up to the next rank.

A select higher rank facility may also or alternately be provided. In one embodiment, selection of the take higher rank button will calculate the maximum amount that must be bid to attain one selected higher rank. In another embodiment, the take higher rank button will calculate the maximum bid required to take all higher ranks.

Figure 10B:
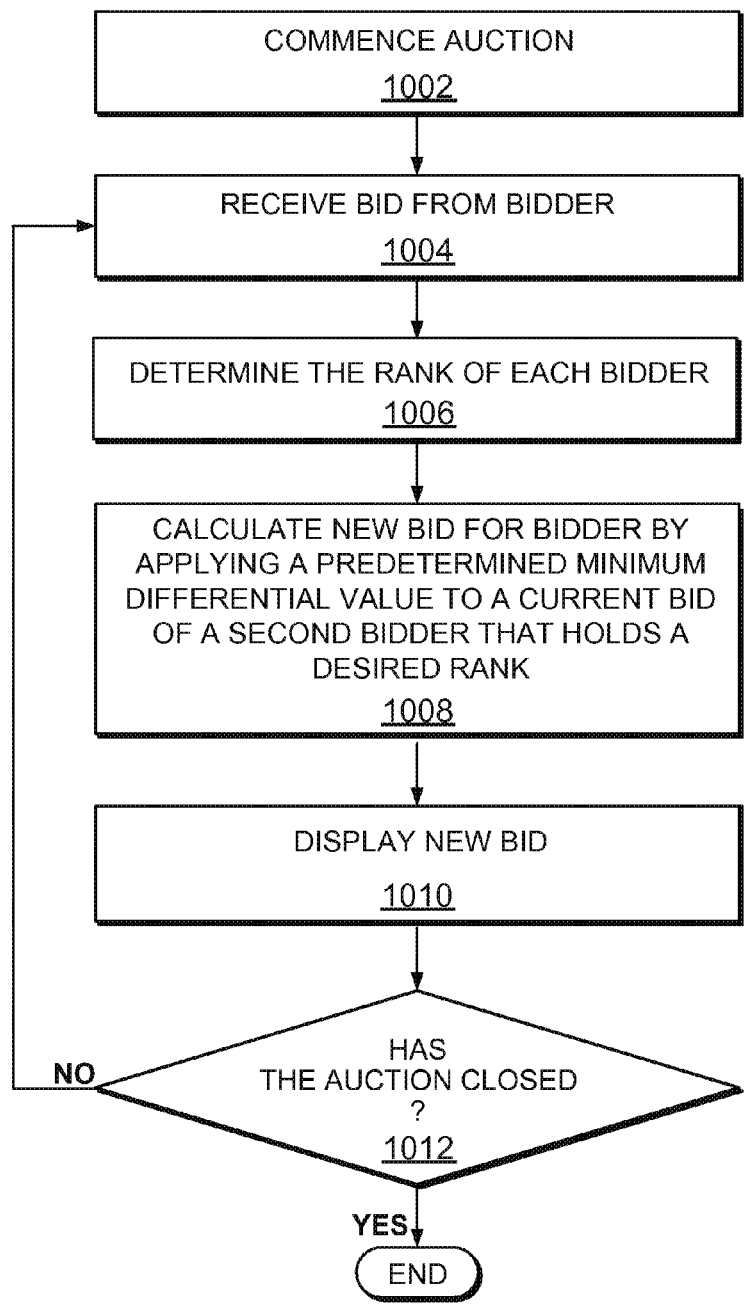
FIG. 10B is a flow diagram illustrating yet another information flow of the present invention.

FIG. 10B is a flow diagram illustrating an embodiment of the present invention. The example provided assumes that a computer processor is executing a set of instructions that perform the steps, however, it will be recognized by one skilled in the art that the instructions may be carried out by any known method. At 1002, an auction is commenced and bids are accepted from bidders. At 1004, a bid is received from a bidder. At 1006, the rank of each bidder is determined. At 1006, a new bid is calculated for the bidder by applying a predetermined minimum differential value to a current bid of a second bidder that holds a desired rank. At 1010, the new bid is displayed to the bidder. The processor determines whether the auction closing time has arrived at 1012. If the auction closing time has not arrived, the processor will return to 1004 to receive additional bids. If the auction closing time has arrived, the auction will close and no additional bids will be accepted.

Referring to FIG. 12, the take next button 367 is dimmed indicating that the button is disabled and, therefore, may not be selected. The take next button 367 of FIG. 12 is disabled because the bidder 30 viewing the screen 360 of FIG. 12 has not yet submitted a valid bid for lot one which is selected in the lot listing 362. The take next button 367 may be enabled for a bidder 30 that has not yet placed a bid, for example, to provide an amount that must be bid to overtake the lowest ranked bidder 30. Enabling the take next button 367 for a non-participating bidder 30, however, permits that non-participating bidder 30 to view market feedback related to the lowest bidder 30. Thus, in the embodiment illustrated in FIG. 12, the viewing bidder 30 is not permitted to utilize the take next button 367 because the rules for that auction 56 are defined such that no market feedback is permitted to be viewed until a bidder 30 has placed a valid bid. Therefore, in the embodiment illustrated in FIG. 12, the viewing bidder 30 must place a bid prior to being permitted to utilize the take next button 367.

Referring to FIGS. 13-16, the take next button 367 is displayed and enabled. In accordance with the rules that are employed in the embodiment illustrated in those Figures, the take next button 367 is enabled because the bidders 30 viewing the screens 380, 400, 420, and 450 of those Figures are permitted to use the take next button 367 because they have submitted at least one bid for the active lot. The auction 56 displayed in FIGS. 11-16 is an index type auction 56 wherein the amount bid is added to a predetermined index price. Thus a bid of 10.00 might indicate a bid of 10.00% over the index price, while a bid of −0.30 might indicate a bid of 0.30% under the index price. Thus, the viewer of screen 380, for example, may select the take next button by, for example using a mouse, keyboard, or touch screen. As may be seen in the lot listing 382, the next better bid is 4.75 which is 4.25 less than the best bid submitted by the viewing bidder 30. If, for example, the minimum differential for the auction 56 depicted on screen 380 is 0.1, then selection of the take next button 367 would provide a value of 4.65 which is equal to the value of the next better bid of 4.75 less the minimum differential of 0.10.

Example 8

Tables 37-41 illustrate a reserve price format of the invention that takes into consideration the setting of a reserve price as discussed hereinbefore. In that format, bidders 30 do not view any market feedback unless their current best bid is below the reserve price. That format rewards bidders 30 who have made a minimum commitment to pursue an award by bidding below the reserve price. Thus, no market feedback is made available to bidders 30 who have not submitted a bid below the reserve price threshold, thereby limiting or eliminating disclosure of price sensitive information to bidders 30 who merely watch the auction 56 without participating therein. The reserve price format, therefore, may beneficially be used to inform all participants that the reserve price is a serious threshold which bidders 30 must meet before the purchaser 10 is willing to consider an award of the business to a non-incumbent. The reserve price format also puts pressure on incumbents to at least meet the reserve price once other bidders 30 have bid below the reserve price.

Referring again to the sequence of bidding activity in FIG. 1, the following example assumes that the auction 56 is taking place in the reserve price format and the reserve price is set at $555,000. At 1:06:00 PM the complete bid history (not visible to any bidder 30 in this example) is repeated below in Table 37.

TABLE 37

| 6. Below Reserve Only (1:06:00 PM) | | | | Bid vs Reserve | | Bid vs. Market Lead | | |
| --- | --- | --- | --- | --- | --- | --- | --- | --- |
| Bidder | Bid Time | Bid | Reserve | $ | % | $ | % | Rank |
| Bidder A | 1:02:45 PM | $670,000 | $555,000 | $115,000 | 20.75% | $112,500 | 20.18% | |
| Bidder B | 1:01:23 PM | $664,000 | $555,000 | $109,000 | 19.64% | $106,500 | 19.10% | |
| Bidder C | 1:01:28 PM | $560,000 | $555,000 | $5,000 | 0.90% | $2,500 | 0.45% | 6 |
| Bidder B | 1:03:10 PM | $559,000 | $555,000 | $4,000 | 0.72% | $1,500 | 0.27% | 5 |
| Bidder D | 1:02:50 PM | $558,500 | $555,000 | $3,500 | 0.63% | $1,000 | 0.18% | 4 |
| Bidder A | 1:03:38 PM | $558,300 | $555,000 | $3,300 | 0.59% | $800 | 0.14% | 3 |
| Bidder E | 1:05:12 PM | $557,700 | $555,000 | $2,700 | 0.49% | $200 | 0.04% | 2 |
| Bidder F | 1:05:43 PM | $557,500 | $555,000 | $2,500 | 0.45% | $— | 0.00% | 1 |

Following Bidder E to illuminate the operation of the reserve price format, at 1:06:00 PM Bidder E has placed one bid of $557,700 at 1:05:12 PM. Since that bid is above the reserve price, Bidder E does not receive any feedback about the remainder of the bidding activity in the auction 56, as shown in Table 38.

TABLE 38

| 6. Below Reserve Only (Bidder E) | | | | Bid vs Reserve | |
| --- | --- | --- | --- | --- | --- |
| Bidder | Bid Time | Bid | Reserve | $ | % |
| Bidder E | 1:05:12 PM | $557,500 | $555,000 | $2,700 | 0.49% |
| No bid history is available until a bid has been submitted below the reserve price. | | | | | |

As may be seen by reference to Table 1, Bidder E did not submit any further bids in the auction 56, and so does not receive any further market feedback during the auction 56. In contrast, at 1:06:00 PM Bidder F has submitted only one bid of $557,500. Like Bidder E, Bidder F will receive no market feedback at 1:06:00 PM because the lowest submitted bid of Bidder F is above the reserve price. Thus, at 1:06:00 PM, Bidder F would view the information provided in Table 39.

TABLE 39

| 6. Below Reserve Only (Bidder F) | | | | Bid vs Reserve | |
| --- | --- | --- | --- | --- | --- |
| Bidder | Bid Time | Bid | Reserve | $ | % |
| Bidder F | 1:05:43 PM | $557,500 | $555,000 | $2,500 | 0.45% |
| No bid history is available until a bid has been submitted below the reserve price. | | | | | |

However, unlike Bidder E, Bidder F submits a bid of $546,400 at 1:07:49 PM. That bid is below the reserve price of $555,000 and, accordingly, Bidder F sees the full bid history as shown is below in Table 40 after the 1:07:49 PM bid is placed. At 1:07:49 PM, Bidder F is able to sec that it is ranked first, and also becomes aware through the market feedback that there are two other bidders 30 who are below reserve price and within $3,000 or 0.5% of the current best bid of Bidder F. Although the identity of the other participants is not visible in this example, Bidder F would also see that there are six other bidders 30 participating in the auction 56 and that a total of twelve bids have been placed thus far in the auction 56.

TABLE 40

| 6. Below Reserve Only (Bidder F) | | | | Bid vs Reserve | | Bid vs. Market Lead | | |
|---|---|---|---|---|---|---|---|---|
| Bidder | Bid Time | Bid | Reserve | $ | % | $ | % | Rank |
| Bidder A | 1:02:45 PM | $670,000 | $555,000 | $115,000 | 20.75% | $123,600 | 22.62% | |
| Bidder B | 1:01:23 PM | $664,000 | $555,000 | $109,000 | 19.64% | $117,600 | 21.52% | |
| Bidder C | 1:01:28 PM | $560,000 | $555,000 | $5,000 | 0.90% | $13,600 | 2.49% | |
| Bidder B | 1:03:10 PM | $559,000 | $555,000 | $4,000 | 0.72% | $12,600 | 2.31% | 7 |
| Bidder D | 1:02:50 PM | $558,500 | $555,000 | $3,500 | 0.63% | $12,100 | 2.21% | 6 |
| Bidder A | 1:03:38 PM | $558,300 | $555,000 | $3,300 | 0.59% | $11,900 | 2.18% | 5 |
| Bidder E | 1:05:12 PM | $557,700 | $555,000 | $2,700 | 0.49% | $11,300 | 2.07% | 4 |
| Bidder F | 1:05:43 PM | $557,500 | $555,000 | $2,500 | 0.45% | $11,100 | 2.03% | |
| Bidder C | 1:06:49 PM | $552,000 | $555,000 | $(3,000) | −0.54% | $5,600 | 1.02% | |
| Bidder G | 1:06:55 PM | $549,000 | $555,000 | $(6,000) | −1.08% | $2,600 | 0.48% | 3 |
| Bidder C | 1:07:22 PM | $546,800 | $555,000 | $(8,200) | −1.48% | $400 | 0.07% | 2 |
| Bidder F | 1:07:49 PM | $546,400 | $555,000 | $(8,600) | −1.55% | $— | 0.00% | 1 |

Bidder F is entitled to view the bid history, for the remainder of the auction 56 in this example, because Bidder F has submitted a bid less than the reserve price as required to see that market feedback. As may be seen by reference to Table 1, Bidder F does not submit any additional bids during the auction 56 and, thus, falls back to fourth place by the time the auction 56 ends at 1:08:44 PM. The market feedback that Bidder F will see at 1:08:44 PM is shown in Table 41.

TABLE 41

| 6. Below Reserve Only (Bidder F) | | | | Bid vs Reserve | | Bid vs. Market Lead | | |
|---|---|---|---|---|---|---|---|---|
| Bidder | Bid Time | Bid | Reserve | $ | % | $ | % | Rank |
| Bidder A | 1:02:45 PM | $670,000 | $555,000 | $115,000 | 20.75% | $128,000 | 23.62% | |
| Bidder B | 1:01:23 PM | $664,000 | $555,000 | $109,000 | 19.64% | $122,000 | 2.51% | |
| Bidder C | 1:01:28 PM | $560,000 | $555,000 | $5,000 | 0.90% | $18,000 | 3.32% | |
| Bidder B | 1:03:10 PM | $559,000 | $555,000 | $4,000 | 0.72% | $17,000 | 3.14% | |
| Bidder D | 1:02:50 PM | $558,500 | $555,000 | $3,500 | 0.63% | $16,500 | 3.04% | |
| Bidder A | 1:03:38 PM | $558,300 | $555,000 | $3,300 | 0.59% | $16,300 | 3.01% | 6 |
| Bidder E | 1:05:12 PM | $557,700 | $555,000 | $2,700 | 0.49% | $15,700 | 2.90% | 5 |
| Bidder F | 1:05:43 PM | $557,500 | $555,000 | $2,500 | 0.45% | $15,500 | 2.86% | |
| Bidder C | 1:06:49 PM | $552,000 | $555,000 | $(3,000) | −0.54% | $10,000 | 1.85% | |
| Bidder G | 1:06:55 PM | $549,000 | $555,000 | $(6,000) | −1.08% | $7,000 | 1.29% | |
| Bidder C | 1:07:22 PM | $546,800 | $555,000 | $(8,200) | −1.48% | $4,800 | 0.89% | |
| Bidder F | 1:07:49 PM | $546,400 | $555,000 | $(8,600) | −1.55% | $4,400 | 0.81% | 4 |
| Bidder C | 1:08:02 PM | $546,250 | $555,000 | $(8,750) | −1.58% | $4,250 | 0.78% | 3 |
| Bidder B | 1:08:17 PM | $545,000 | $555,000 | $(10,000) | −1.80% | $3,000 | 0.55% | 2 |
| Bidder G | 1:08:44 PM | $542,000 | $555,000 | $(13,000) | −2.34% | $— | 0.00% | 1 |

Other differential feedback technology and differential feedback rules could also be applied to such a reserve price formatted auction 56. For example, rather than providing no market feedback to bidders 30 that have not bid below the reserve price, the auction 56 could provide limited market feedback to those bidders 30 and full market feedback to bidders 30 who have bid below reserve. The limited feedback might include, for example, rank only or bid history of all the bids placed by bidders 30 that are above the reserve price but not any of the bids below reserve price. In the latter example, a bidder 30 who has not placed a bid below the reserve price would lose access to market feedback from those bidders 30 bidding below the reserve price until that bidder 30 also places a bid below reserve price.

In another embodiment, the market leader format may be combined with the reserve price format to provide additional incentive to bidders 30 to continue bidding aggressively after they have crossed the reserve price threshold. For example, bid history might only be visible to participants who (i) have bid below reserve price; and (ii) are ranked in, for example, the top three bidders 30.

Alternatively, bid history might be visible to all bidders 30 below reserve until there are at least, for example, three bidders 30 below that have placed bids below the reserve price. Once more than three bidders 30 have bid below the reserve price in that example, only the top three bidders 30 would continue to view the full bid history.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing auctions, the auction functions can be equally applied to upward pricing auctions. Thus, it is intended that the present invention cover the modifications and variations of this invention provided they come within the scope of the appended claims and their equivalents.

The invention claimed is:

1. A system for determining a suggested bid value that surpasses a selected bid, comprising:
   at least one computer processor; and
   at least one memory having instructions which configure the at least one computer processor to:
      provide a user selectable facility that is configured to receive from a user a selection event that indicates the user's selection of a desired rank, which is other than a first ranked bid;
      in response to receiving the selection event associated with the user selectable facility:
         establish a value of the selected bid, which is other than a value of the first ranked bid;

calculate the suggested bid value by applying a predetermined minimum differential value to the selected bid value; and
convey the suggested bid value to the user.

2. The system of claim 1, wherein said applying the predetermined minimum differential value to the selected bid value includes subtracting the predetermined minimum differential value from the selected bid value.

3. The system of claim 1, wherein said applying the predetermined minimum differential value to the selected bid value includes adding the predetermined minimum differential value from the selected bid value.

4. The system of claim 1, wherein the predetermined minimum differential value is a percentage of the selected bid value.

5. The system of claim 1, wherein the selected bid value is a bid previously placed in an auction.

6. The system of claim 1, wherein the selected bid value is retrieved from a second computer processor.

7. A method for determining a suggested bid value that surpasses a selected bid, comprising:
providing a user selectable facility that is configured to receive from a user a selection event that indicates the user's selection of a desired rank, which is other than a first ranked bid;
in response to receiving the selection event associated with the user selectable facility:
establishing, by a processor, a value of the selected bid, which is other than a value of the first ranked bid;
calculating, by the processor, the suggested bid value by applying a predetermined minimum differential value to the selected bid value; and
conveying, via an interface, the suggested bid value to the user.

8. The method of claim 7, wherein said applying the predetermined minimum differential value to the selected bid value includes subtracting the predetermined minimum differential value from the selected bid value.

9. The method of claim 7, wherein said applying the predetermined minimum differential value to the selected bid value includes adding the predetermined minimum differential value from the selected bid value.

10. The method of claim 7, wherein the predetermined minimum differential value is a percentage of the selected bid value.

11. The method of claim 7, wherein the selected bid value is a bid previously placed in an auction.

12. A computer program product for determining a suggested bid value that surpasses a selected bid, the computer program product being embodied in a non-transitory computer readable storage medium and comprising computer instructions for:
providing a user selectable facility that is configured to receive from a user a selection event that indicates the user's selection of a desired rank, which is other than a first ranked bid;
in response to receiving the selection event associated with the user selectable facility:
establishing a value of the selected bid, which is other than a value of the first ranked bid;
calculating the suggested bid value by applying a predetermined minimum differential value to the selected bid value; and
conveying the suggested bid value to the user.

13. The computer program product of claim 12, wherein said applying the predetermined minimum differential value to the selected bid value includes subtracting the predetermined minimum differential value from the selected bid value.

14. The computer program product of claim 12, wherein said applying the predetermined minimum differential value to the selected bid value includes adding the predetermined minimum differential value from the selected bid value.

15. The computer program product of claim 12, wherein the selected bid value is a bid previously placed in an auction.

16. The computer program product of claim 12, wherein the selected bid value is retrieved from a second computer processor.

* * * * *